United States Patent
Cur et al.

(10) Patent No.: US 9,511,315 B2
(45) Date of Patent: Dec. 6, 2016

(54) WATER PITCHER WITH FILTER

(71) Applicant: Whirlpool Corporation, Benton Harbor, MI (US)

(72) Inventors: Nihat O. Cur, Stevensville, MI (US); James W. Kendall, Mt. Prospect, IL (US); Ginger Elayne Patera, St. Joseph, MI (US); Mark M. Senninger, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 153 days.

(21) Appl. No.: 14/095,059

(22) Filed: Dec. 3, 2013

(65) Prior Publication Data

US 2014/0151284 A1   Jun. 5, 2014

Related U.S. Application Data

(60) Provisional application No. 61/733,020, filed on Dec. 4, 2012.

(51) Int. Cl.
  *B01D 27/02* (2006.01)
  *B01D 35/30* (2006.01)
  (Continued)

(52) U.S. Cl.
  CPC .............. *B01D 35/30* (2013.01); *B01D 15/10* (2013.01); *C02F 1/001* (2013.01); *C02F 1/003* (2013.01); *C02F 1/281* (2013.01); *C02F 1/42* (2013.01); *C02F 1/68* (2013.01); *C02F 5/10* (2013.01); *C02F 2101/20* (2013.01); *C02F 2101/306* (2013.01); *C02F 2101/322* (2013.01); *C02F 2307/04* (2013.01)

(58) Field of Classification Search
  CPC .... C02F 1/003; C02F 2307/04; B65D 25/14; B65D 25/48; B32B 17/10027; B32B 17/10; A47G 9/12
  See application file for complete search history.

(56) References Cited

U.S. PATENT DOCUMENTS

| 651,948 A | 6/1900 | Lawson |
|---|---|---|
| 1,536,890 A | 5/1925 | Lagemann |

(Continued)

FOREIGN PATENT DOCUMENTS

| EP | 1354857 A1 | 10/2003 |
|---|---|---|
| FR | 2884829 A1 | 10/2003 |

(Continued)

OTHER PUBLICATIONS

Drop Speaker, Zumreed, "Music with Style", Copyright 2010 Dreams, Inc.

(Continued)

*Primary Examiner* — Matthew O Savage

(57) ABSTRACT

A water pitcher system that includes a water receiving aperture configured to allow water to be delivered into an interior water storage volume defined by a base and at least one upwardly extending wall extending upward from the base. The at least one upwardly extending wall includes an inner fluid facing wall section having an inner fluid facing surface and an outer user facing wall section having an exterior, user facing surface where the inner fluid facing wall section and the outer user facing wall section are each composites of a plastic substrate and a glass layer, typically deposited by vapor deposition or blow-molding, onto the plastic substrate. The inner fluid facing surface and the outer user facing surface are the glass layers.

12 Claims, 38 Drawing Sheets

(51) Int. Cl.
*C02F 1/00* (2006.01)
*B01D 15/10* (2006.01)
C02F 1/28 (2006.01)
C02F 1/42 (2006.01)
C02F 1/68 (2006.01)
C02F 5/10 (2006.01)
C02F 101/20 (2006.01)
C02F 101/30 (2006.01)
C02F 101/32 (2006.01)

(56) References Cited

U.S. PATENT DOCUMENTS

| | | | |
|---|---|---|---|
| 1,674,203 A | 6/1928 | Holz et al. | |
| 2,381,104 A * | 8/1945 | Burnham | A47J 31/043 210/474 |
| 3,221,915 A * | 12/1965 | Gort | B29C 44/146 215/13.1 |
| 3,266,411 A * | 8/1966 | Oakley | A47J 31/446 210/474 |
| 3,400,865 A * | 9/1968 | Hester | A47G 23/0241 222/475 |
| 3,727,764 A | 4/1973 | Ogden | |
| 3,823,824 A | 7/1974 | Close | |
| 4,072,243 A | 2/1978 | Conant et al. | |
| 4,283,283 A | 8/1981 | Zimmerman | |
| 4,419,235 A | 12/1983 | Sway | |
| 4,528,095 A | 7/1985 | Byrne | |
| 4,676,385 A * | 6/1987 | Zimmermann | A47J 41/00 215/12.1 |
| 4,764,274 A | 8/1988 | Miller | |
| 4,828,692 A | 5/1989 | Peranio | |
| 4,860,906 A * | 8/1989 | Pellegrini | A47G 19/12 215/12.2 |
| 4,867,875 A | 9/1989 | Peranio | |
| 4,948,499 A | 8/1990 | Peranio | |
| 4,999,109 A | 3/1991 | Sabre | |
| 5,049,272 A | 9/1991 | Nieweg et al. | |
| 5,318,703 A | 6/1994 | Heiligman | |
| 5,328,597 A | 7/1994 | Boldt et al. | |
| 5,393,548 A | 2/1995 | Heiligman | |
| 5,411,661 A | 5/1995 | Heiligman | |
| 5,652,008 A * | 7/1997 | Heiligman | C02F 1/003 210/263 |
| 5,656,160 A | 8/1997 | Parise et al. | |
| 5,826,493 A | 10/1998 | Lin | |
| 5,846,418 A | 12/1998 | Thompson et al. | |
| 5,914,045 A | 6/1999 | Palmer et al. | |
| 6,024,867 A | 2/2000 | Parise | |
| 6,074,550 A | 6/2000 | Hofmann et al. | |
| 6,290,847 B1 | 9/2001 | Cutler | |
| 6,428,687 B1 | 8/2002 | Moretto | |
| 6,454,941 B1 | 9/2002 | Cutler et al. | |
| D496,429 S | 9/2004 | Donnelly | |
| 6,818,130 B1 | 11/2004 | Varriale et al. | |
| 7,094,334 B1 | 8/2006 | Guzman et al. | |
| 7,163,625 B1 | 1/2007 | Williamson et al. | |
| 7,294,277 B2 | 11/2007 | Moretto | |
| 7,309,418 B2 | 12/2007 | Joyce et al. | |
| 7,585,409 B2 | 9/2009 | Bommi et al. | |
| D602,558 S | 10/2009 | Beams et al. | |
| 7,678,282 B2 | 3/2010 | Moretto | |
| D617,868 S | 6/2010 | Leavitt et al. | |
| 7,836,708 B2 | 11/2010 | Krause et al. | |
| 7,862,720 B2 | 1/2011 | Brown | |
| D657,844 S | 4/2012 | Smiedt et al. | |
| D666,865 S | 9/2012 | Spivey et al. | |
| 2005/0252929 A1 | 11/2005 | Bond | |
| 2007/0045302 A1 | 3/2007 | Fujii et al. | |
| 2008/0116146 A1 | 5/2008 | Harrington et al. | |
| 2009/0199722 A1 | 8/2009 | Bodum | |
| 2010/0044284 A1 | 2/2010 | Scholz | |
| 2010/0084347 A1 | 4/2010 | Wilder et al. | |
| 2010/0206799 A1 | 8/2010 | Leavitt et al. | |
| 2011/0303589 A1 | 12/2011 | Kuennen et al. | |
| 2012/0055862 A1 * | 3/2012 | Parekh | C02F 1/002 210/244 |
| 2012/0148707 A1 | 6/2012 | Lackey et al. | |

FOREIGN PATENT DOCUMENTS

| | | |
|---|---|---|
| GB | 2196329 A | 4/1988 |
| GB | 2200902 A | 8/1988 |
| GB | 2441981 A | 3/2008 |
| WO | 9740906 | 11/1997 |
| WO | 2006110632 A2 | 10/2006 |
| WO | 2007021686 A2 | 2/2007 |
| WO | 2010010572 A2 | 1/2010 |
| WO | 2010080288 | 7/2010 |
| WO | 2011013142 A2 | 2/2011 |
| WO | 2011145646 A1 | 11/2011 |

OTHER PUBLICATIONS

Zumreed Rain Drop LED Bathroom Light, online article by Liszewski, Andrew on May 14, 2007, website www.OHGIZMO.com.
Zumreed Drop—Showering With Your iPod., Copyright One Piece Discoveries Science and Tech Blog 2009-2010.
http://www.somawater.co/ (web page Dec. 2012).
http://www.kickstarter.com/projects/zachallia/soma-beautifully-innovative-all-natural-water-filt (web page Dec. 2012).
International Patent Application No. PCT/US2013073118, filed Dec. 4, 2013, Applicant: Whirlpool Corporation, International Search Report and Written Opinion re: Same, mail date: Apr. 17, 2014.
International Patent Application No. PCT/US2013073126, filed Dec. 4, 2013, Applicant: Whirlpool Corporation, International Search Report and Written Opinion re: Same, mail date: Apr. 17, 2014.
International Patent Application No. PCT/US2013073112, filed Dec. 4, 2013, Applicant: Whirlpool Corporation, International Search Report and Written Opinion re: Same, mail date: Apr. 17, 2014.
International Patent Application No. PCT/US2013073138, filed Dec. 4, 2013, Applicant: Whirlpool Corporation, International Search Report and Written Opinion re: Same, mail date: Apr. 17, 2014.
International Patent Application No. PCT/US2013073149, filed Dec. 4, 2013, Applicant: Whirlpool Corporation, International Search Report and Written Opinion re: Same, mail date: Apr. 17, 2014.
European Patent Office, "Extended European Search Report," issued in connection with European Patent Application No. 13860420.2-1370, mailed Jul. 6, 2016, 4 pages.
European Patent Office, "Extended European Search Report," issued in connection with European Patent Application No. 13861238.7-1370, mailed Jul. 6, 2016, 4 pages.
European Patent Office, "Supplementary Extended European Search Report," issued in connection with European Patent Application No. 13860420.2-1370, mailed Jul. 13, 2016, 11 pages.
European Patent Office, "Extended European Search Report," issued in connection with European Patent Application No. 13860848.4-1370, mailed Jul. 13, 2016, 5 pages.

* cited by examiner

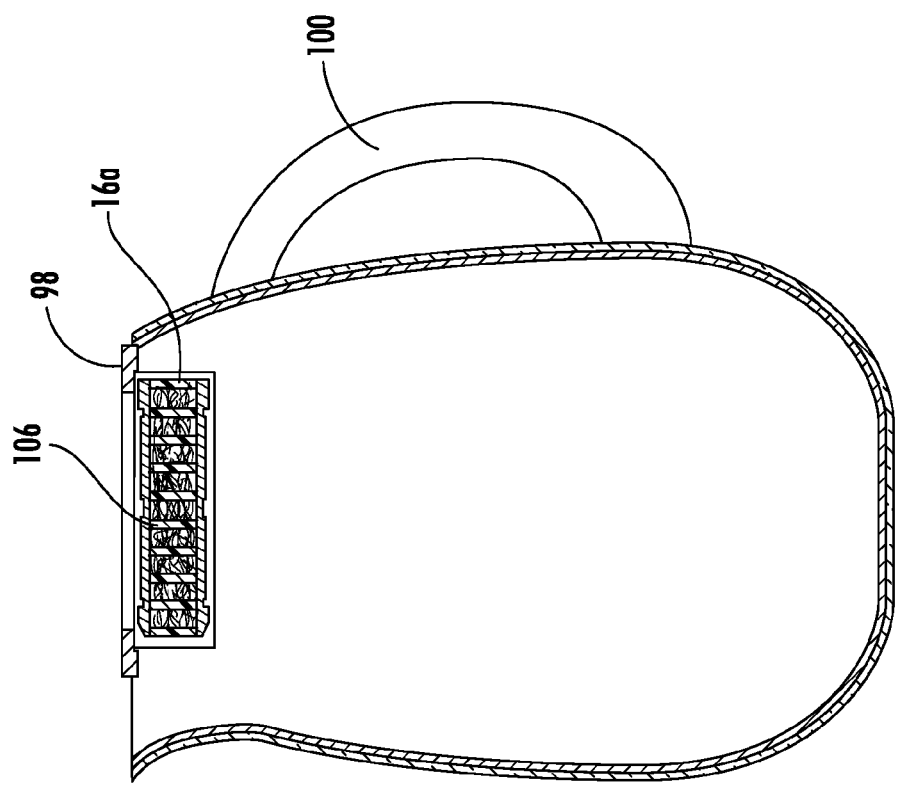
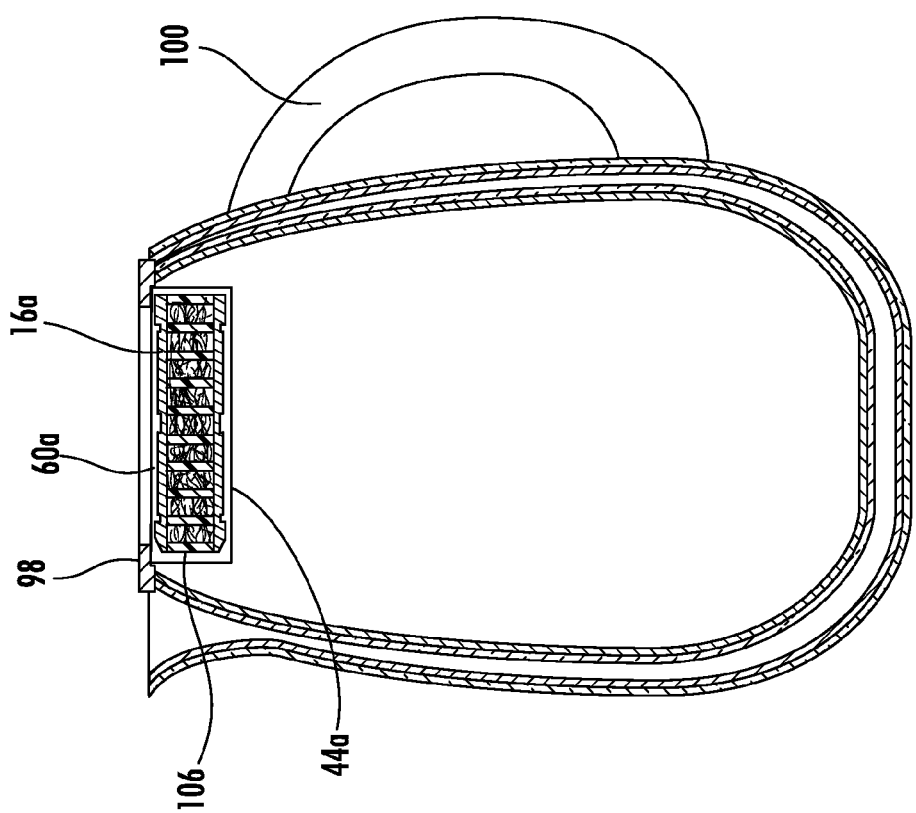

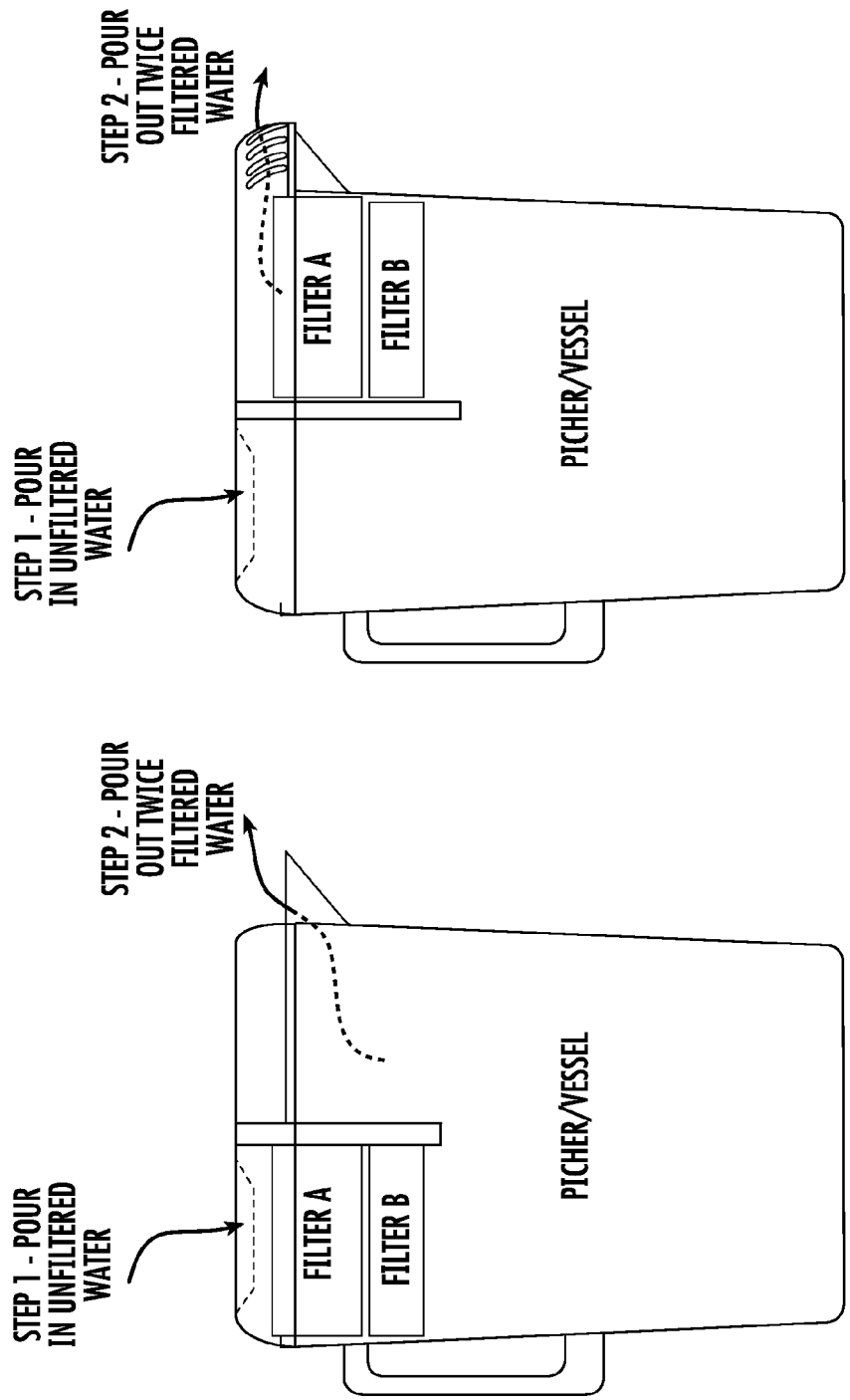

WATER PITCHER WITH FILTER

CROSS-REFERENCE TO RELATED APPLICATION

This application claims priority to and the benefit of U.S. Provisional Patent Application Ser. No. 61/733,020, filed on Dec. 4, 2012, entitled Water Filtration/Treatment System, the entire disclosure of which is hereby incorporated by reference.

SUMMARY OF THE DISCLOSURE

One aspect of the present invention includes a liquid pitcher having a liquid receiving aperture configured to allow a liquid to be delivered into an interior liquid storage volume defined by at least one upwardly extending wall extending upward from a base. The at least one upwardly extending wall includes an inner fluid facing wall section having an inner fluid facing surface and an outer user facing wall section having an outer user facing surface where the inner fluid facing wall section includes a material chosen from glass, stainless steel, gold, silver, and mixtures thereof, and the outer user facing wall section includes a material chosen from the group consisting of glass, plastic, and stainless steel. The inner fluid facing surface and the outer user facing surface are not both glass unless the glass is blow-molded or vapor deposited as a layer onto another media/substrate chosen from the group consisting of a plastic, a metal, and mixtures thereof thereby forming a composite material with glass layer on at least one of the inner fluid facing wall section and the outer user facing wall section.

Another aspect of the present invention includes a water pitcher system that includes a water receiving aperture configured to allow water to be delivered into an interior water storage volume defined by a base and at least one upwardly extending wall extending upward from the base. The at least one upwardly extending wall includes an inner fluid facing wall section having a fluid facing surface and an outer user facing wall section having an exterior, user facing surface where the inner fluid facing wall section and the outer user facing wall section are each composites of a plastic substrate and a glass layer, typically deposited by vapor deposition or blow-molding, onto the plastic substrate. The inner fluid facing surface and the outer user facing surface are the glass layers.

Yet another aspect of the present invention includes a method of making a water pitcher by forming a layer of glass on at least an interior water facing surface and an exterior, user facing surface of at least one upwardly extending plastic wall of a water pitcher where the at least one upwardly extending plastic wall from is either a single upwardly extending plastic wall or a dual upwardly extending plastic wall having an airspace between plastic wall layers where the at least one upwardly extending plastic wall extends upward from a base of the water pitcher and define an interior water receiving volume and the layer of glass is formed by blow molding or vapor depositing the glass onto at least the interior water facing surface and the exterior, user facing surface.

These and other features, advantages, and objects of the present disclosure will be further understood and appreciated by those skilled in the art by reference to the following specification, claims, and appended drawings.

BRIEF DESCRIPTION OF THE DRAWINGS

FIG. 33 is a schematic view of a double walled vessel with the filter and adapter as the top cap of the vessel (pitcher);

FIG. 34 is a schematic view of a single walled vessel with the filter and adapter as the top cap of the vessel (pitcher);

FIG. 38 is a schematic view of a vessel according to an aspect of the present disclosure with two separate filter media treating an intake fluid;

FIG. 39 is a schematic view of a vessel according to an aspect of the present disclosure with two separate filter media treating an outgoing fluid from the vessel;

DETAILED DESCRIPTION

Figure 1:
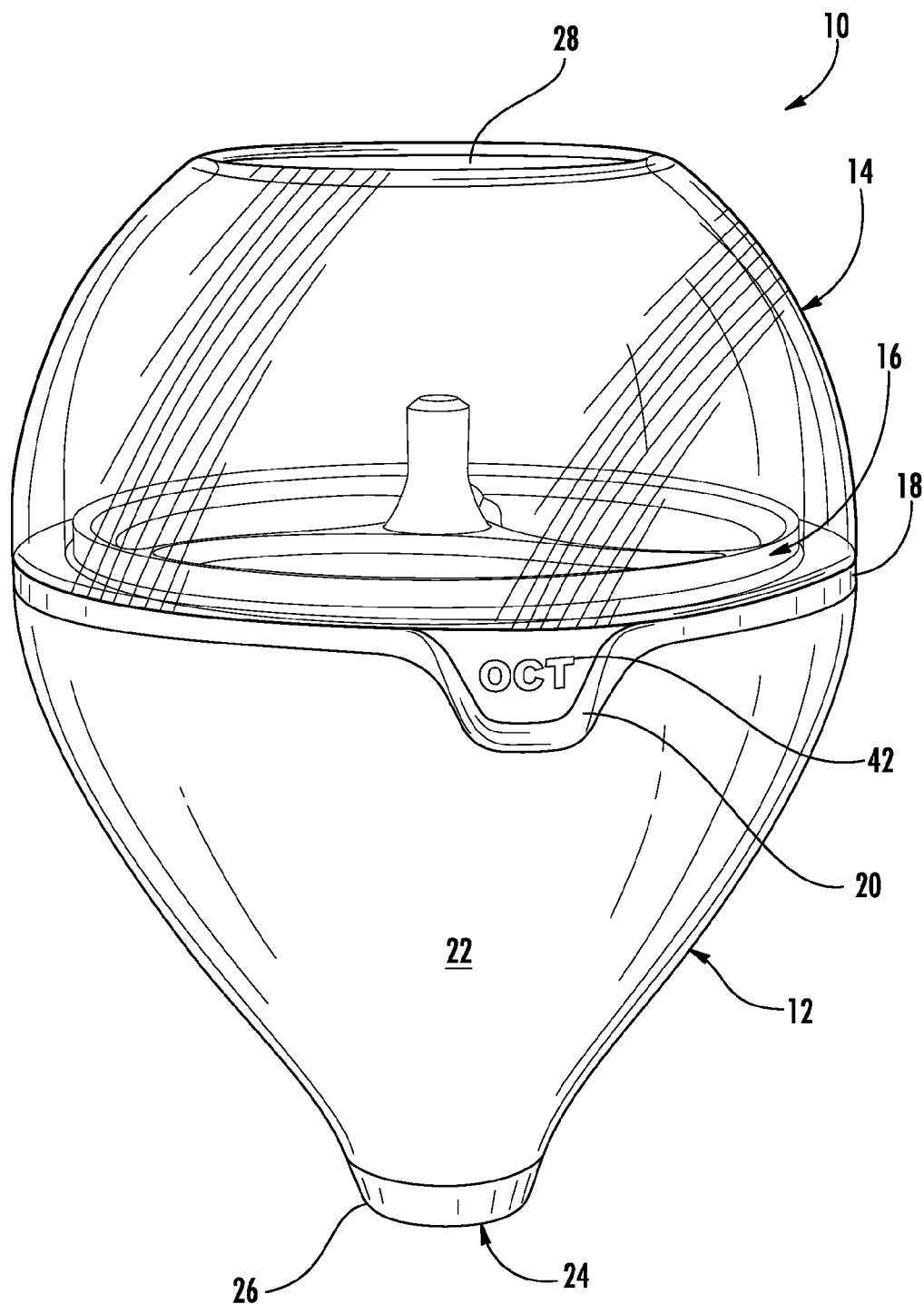
FIG. 1 is a front prospective view of a drop-shaped gravity filter assembly according to an aspect of the present disclosure.
Figure 2:
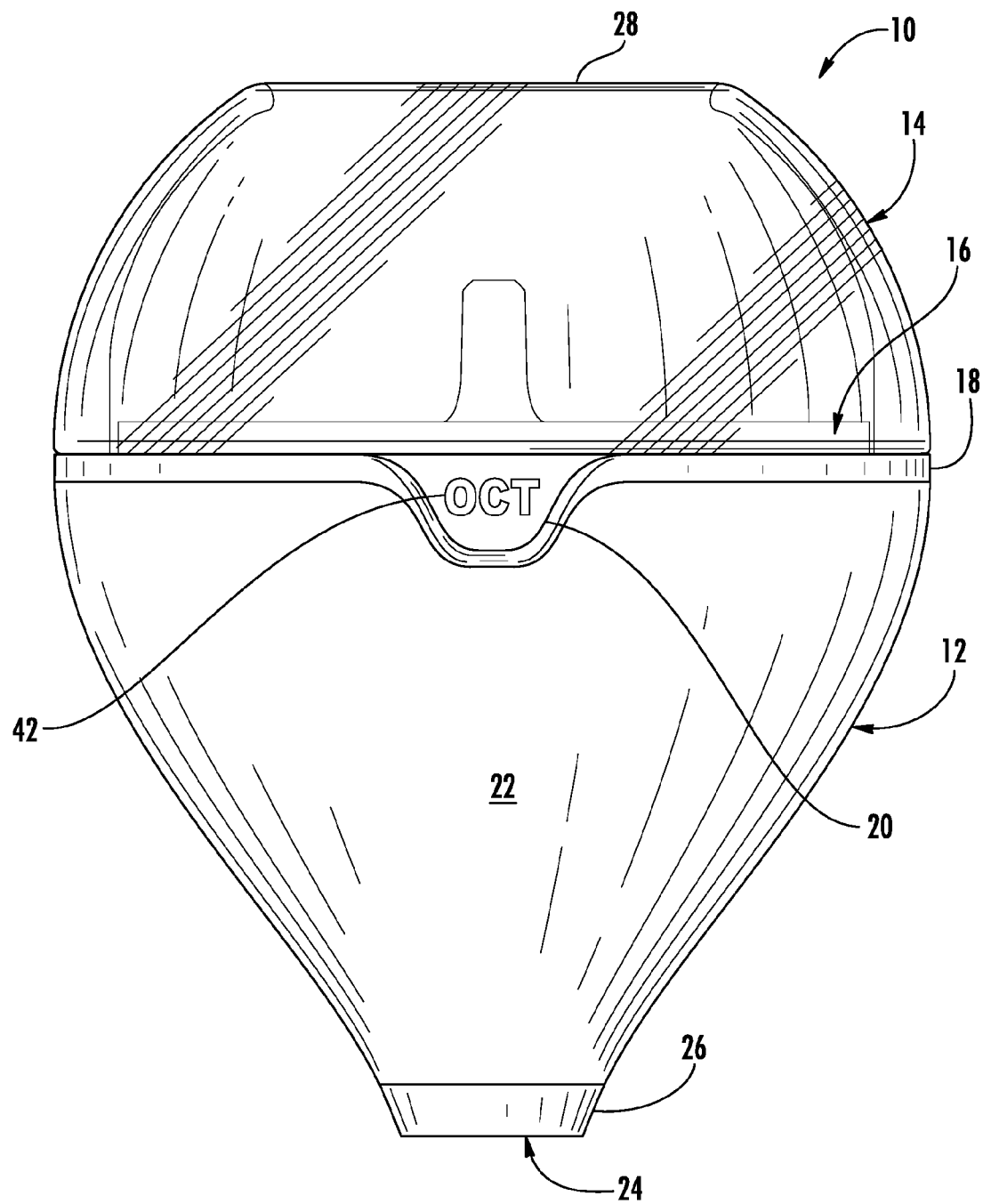
FIG. 2 is an elevated front view of a drop-shaped gravity filter assembly according to an aspect of the present disclosure.
Figure 3:
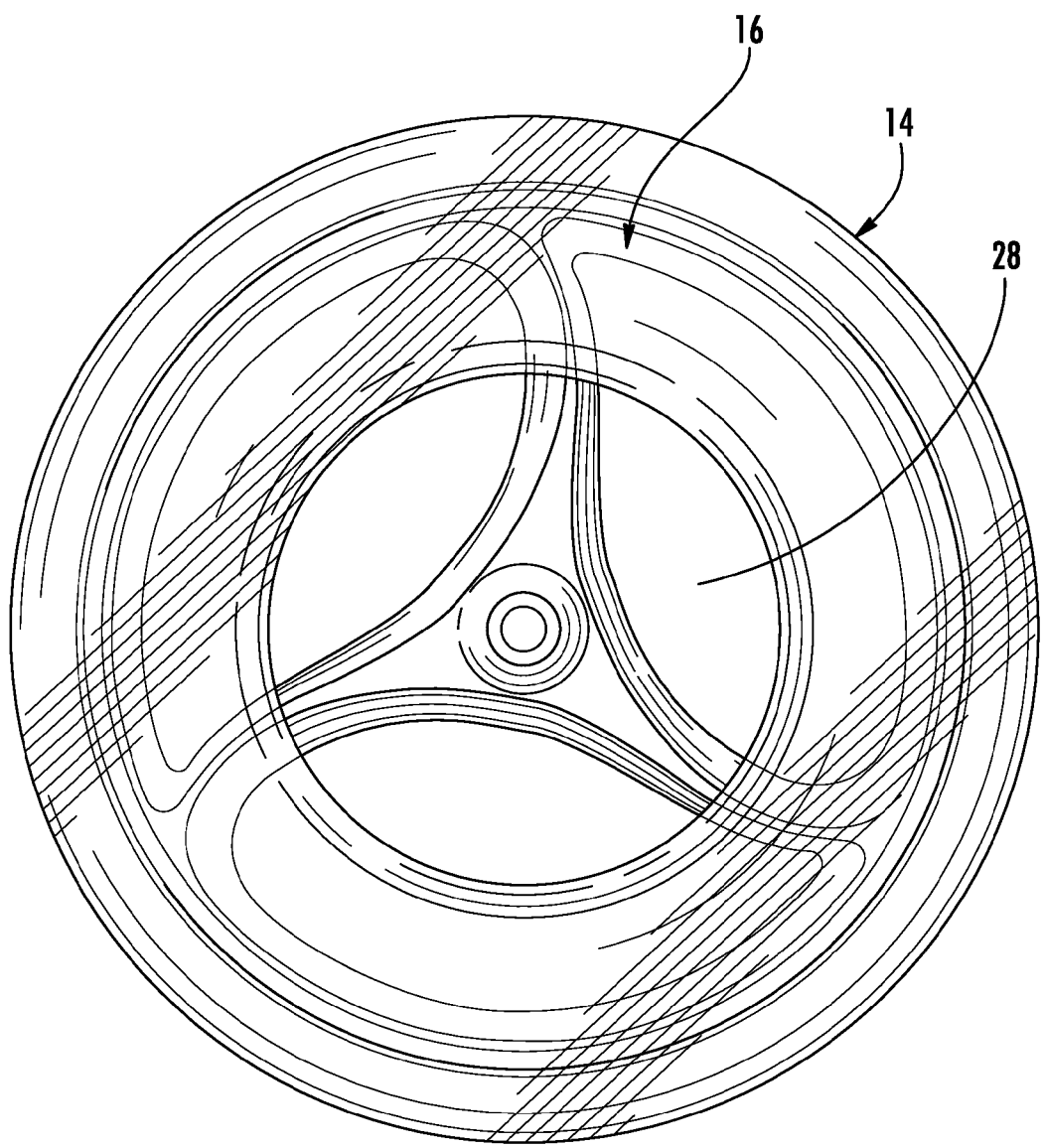
FIG. 3 is a top view of a drop-shaped gravity filter assembly according to an aspect of the present disclosure.
Figure 4:
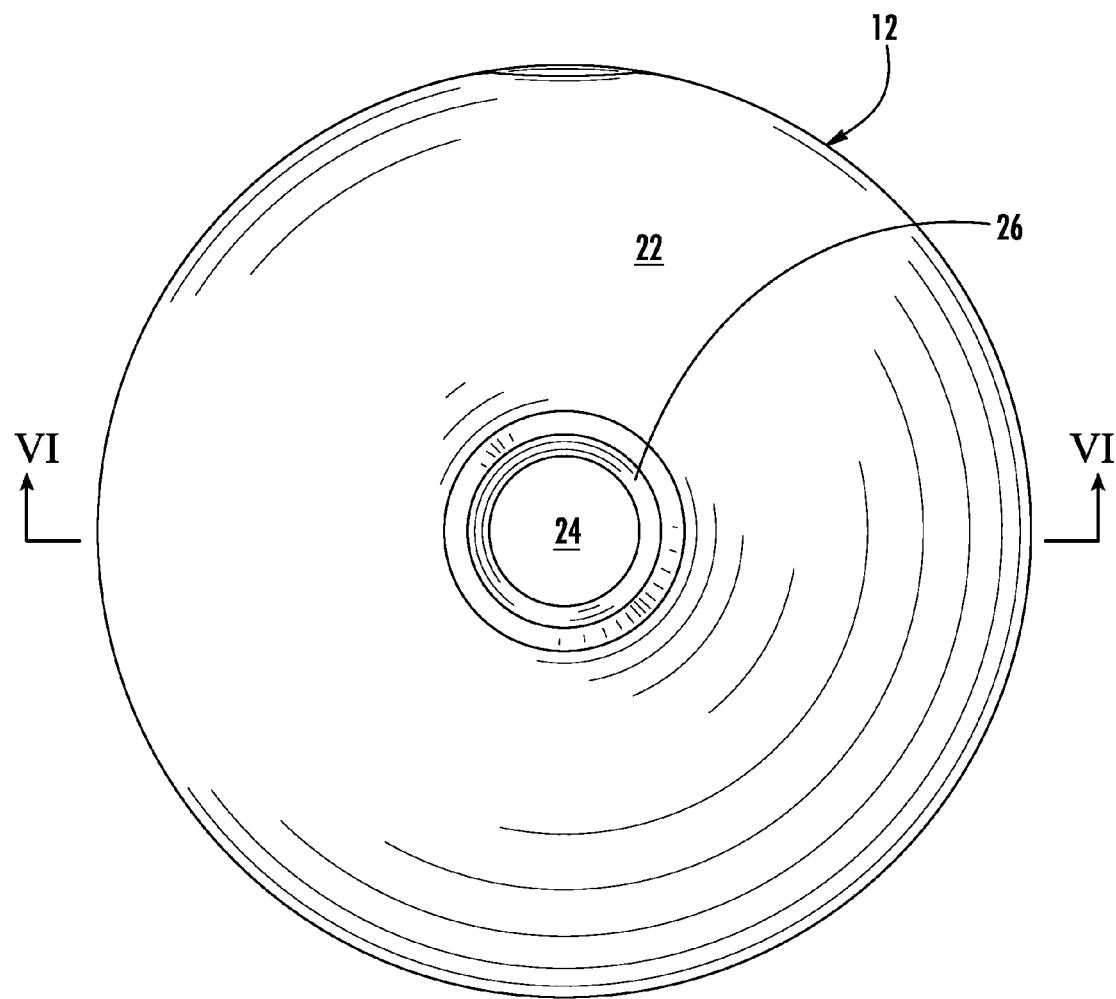
FIG. 4 is a bottom view of a drop-shaped gravity filter assembly according to an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described disclosure and other components is not limited to any specific material. Other exemplary embodiments of the disclosure disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

FIGS. 1-4 show an assembled gravity filter assembly of an aspect of the present disclosure, which filters liquid (water) by using only gravity instead of water pressure to drive the water through the filter assembly and the treatment medium. The gravity filter assembly is generally drop-shaped design, but conceivably could be any shape such as a cylinder-shaped design. The gravity filter assembly 10 may treat any fluid, but typically would be used to filter and/or treat water. The drop shaped gravity filter assembly 10 typically has at least a bottom funnel portion 12, a top cap portion 14, and a filter 16. The bottom funnel portion typically has a perimeter 18 that operably engages the filter 16 and the top cap portion when the components are assembled for use. The bottom funnel portion typically, but optionally, has a cutout portion 20 that allows for a portion of the exterior of the filter to show through and be visible to a user of the drop-shaped gravity filter. The outside surface 22 of the bottom funnel portion 12 typically has a curvilinear perimeter path that terminates at a liquid outlet 24, typically a water outlet, at the base 26 of the bottom funnel portion 12. The bottom funnel portion is conically shaped and tapers smoothly following the curvilinear path from the perimeter, which is typically circular, to the base 26. The bottom funnel portion 12, the top cap portion 14, and the filter 16 are typically constructed of a polymeric (plastic) material, but could also be constructed of glass or other material as well. The material may be opaque, translucent, or transparent. Typically, the bottom funnel portion 12 is opaque and the top cap portion 14 is transparent or translucent. The top cap portion typically has a liquid receiving aperture 28, which is typically circular, at the upper surface of the top cap section. The aperture 28 is typically sized to at least receive a given amount of water flow, which may be a water flow from a faucet.

Figure 5:
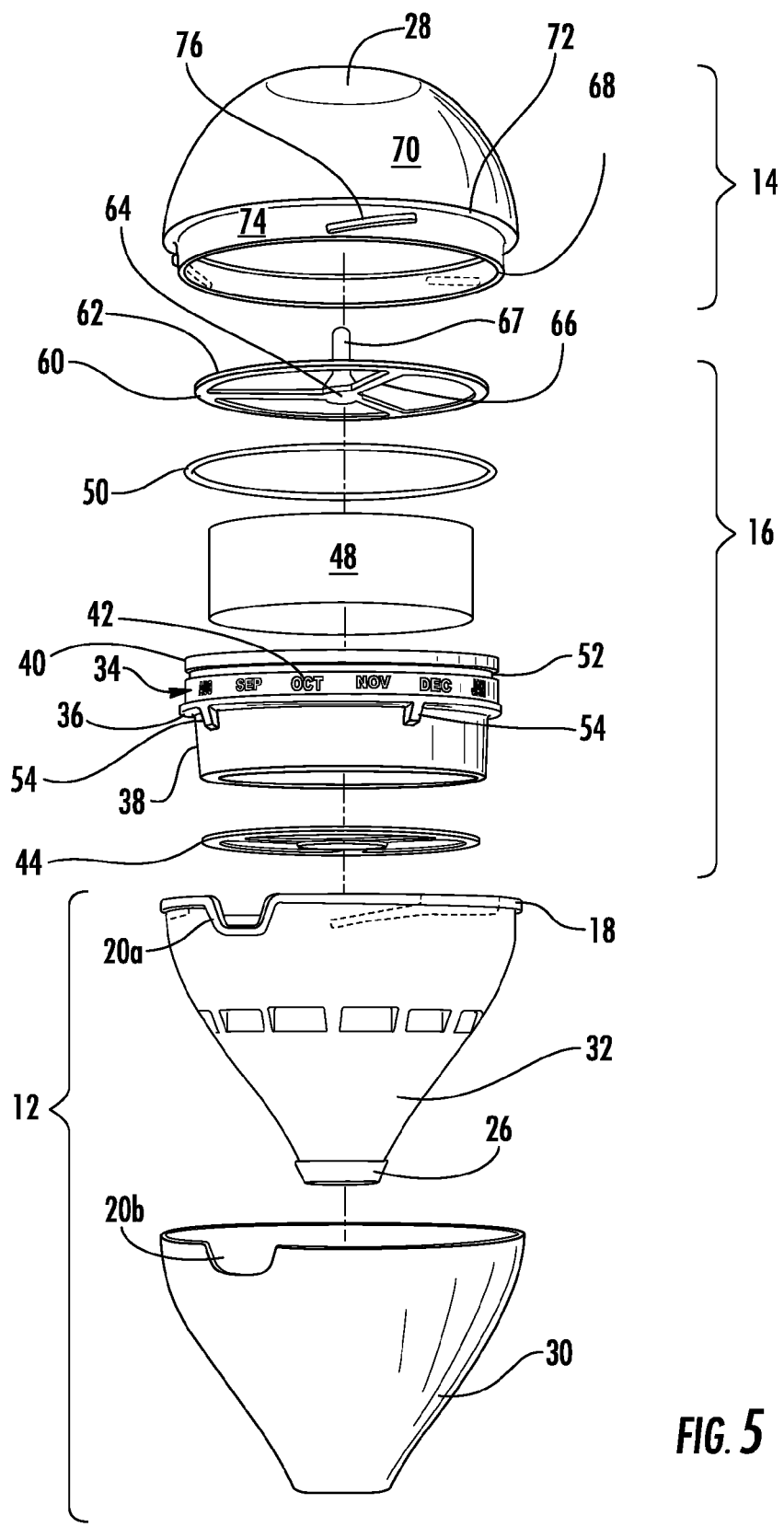
FIG. 5 is an exploded view of a drop-shaped gravity filter assembly according to an aspect of the present disclosure.
Figure 5A:
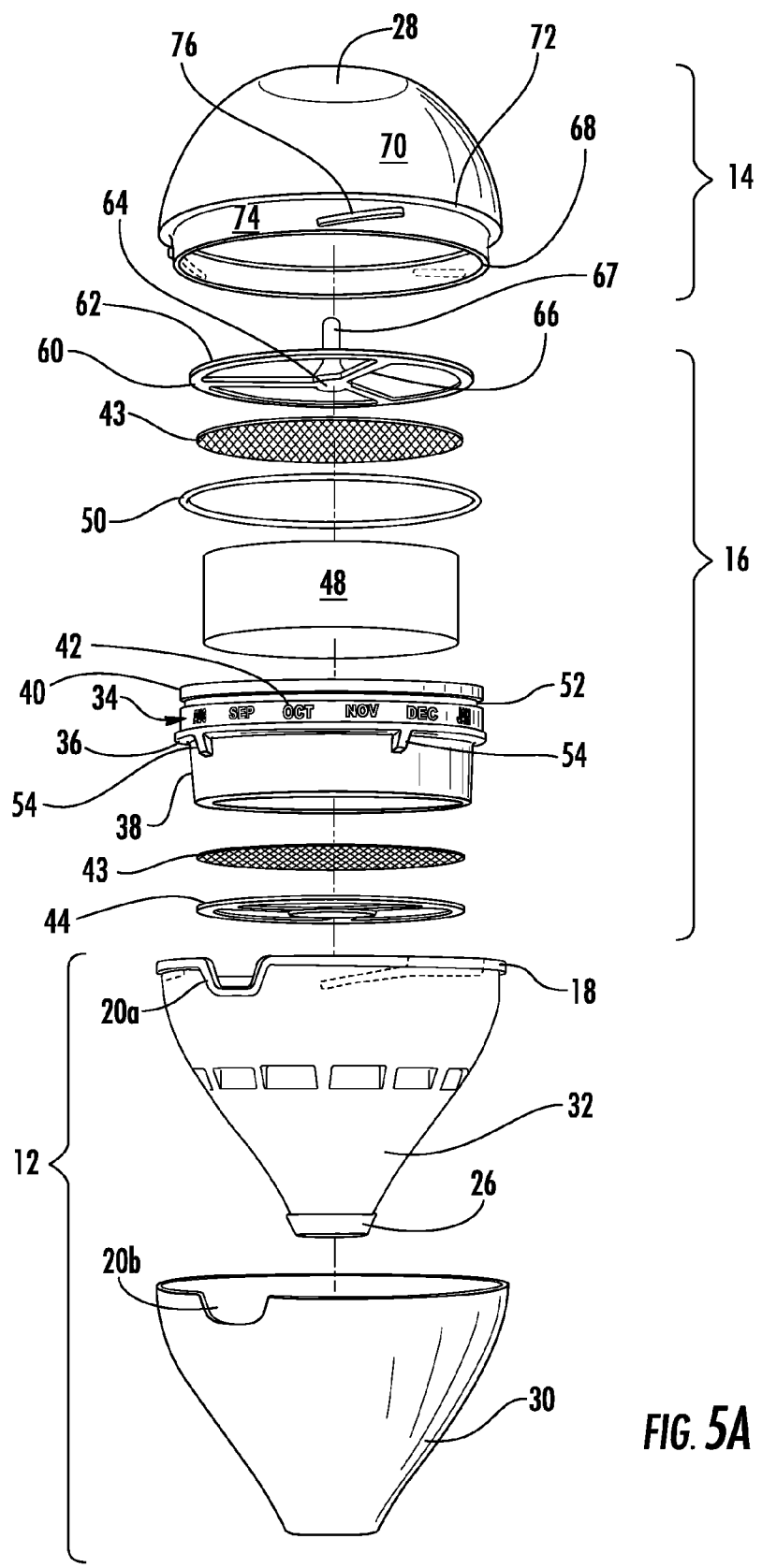
FIG. 5A is an exploded view of a drop-shaped gravity filter assembly according to another aspect of the present disclosure.
Figure 6:
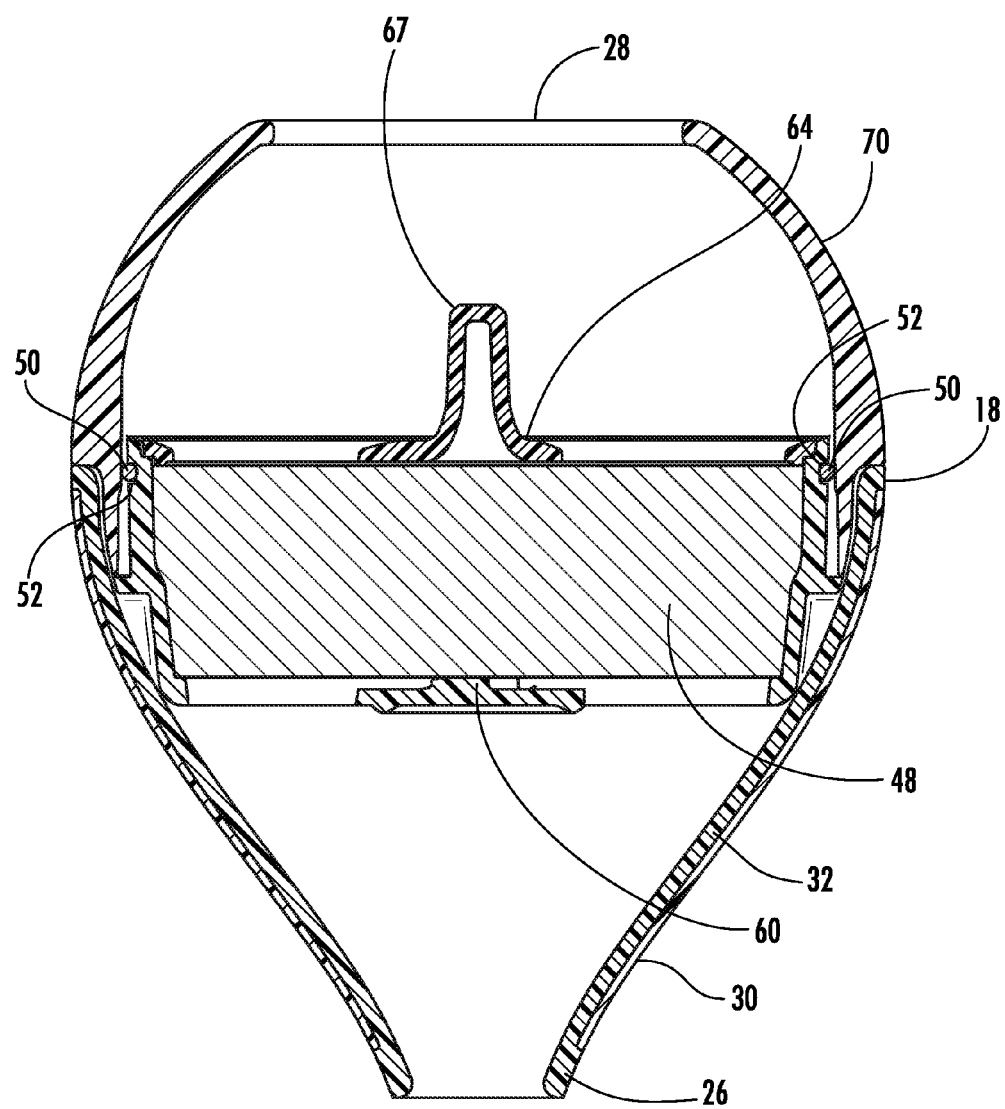
FIG. 6 is a cross-sectional view of a drop-shaped gravity filter assembly according to an aspect of the present disclosure taken along the plain of VI-VI in FIG. 4.

FIGS. 5 and 5A show exploded views of embodiments of the gravity filter assembly 10 according to the present disclosure. The drop-shaped gravity filter assembly bottom portion 12 typically has an over-molded material 30, which is typically a plastic or an elastomeric material that facilitates gripping of the filter by the user and/or the vessel it may be engaged with during a filtering operation. The over-molded material 30 also typically has a cutout portion 20b that matches the cutout portion 20a of the host component 32 of the overall bottom funnel portion 12 when a cutout portion 20 is present as part of the bottom funnel portion 12.

An aspect of the filter 16 is also shown exploded in FIG. 5 and another in FIG. 5A. The filter typically has a side wall section 34. The side wall section 34 has an outwardly projecting lip 36 typically positioned about two-thirds of the way to the top of the side wall section. The outwardly projecting lip 36 is typically positioned proximate the bottom of the side wall section, but may be up to about ½ to about ⅔ up the side wall section such that it divides the side wall section into a bottom portion 38 and an upper portion 40. The upper portion may have at least one, but typically has a plurality of indicators 42. The indicators are typically visible within the cutout portion 20. They typically function to indicate to the user when the filter should be replaced. When the filter has a six month useful life, for example, and the user inserts the filter in April, the user should, in the embodiment shown, place the filter within the bottom funnel portion, such that it mates with the bottom portion and displays "OCT" through the cutout portion as shown. In addition, a version is conceived where the indication shows both the install and end of life month abbreviation through the cutout portion 20. Also, as shown in FIGS. 15A, 16A, 19A, and 20A and described in more detail later, the filter 16 may be shorter and have the section of the side wall with the indicators 42 removed. As shown in FIG. 5A, a mesh material, which typically is a stainless steel mesh screen or a plastic (polyethylene or polypropylene) mesh screen 43 may be integrated or engaged with the filter base 44 and the filter top 60 as well. As shown in FIG. 5A, the water filter 16 includes a container defined by the sidewall 34 and upper and lower screens 43, 44, and a water treatment medium 48 positioned within the container, wherein the container is operably engaged with the bottom portion 12 and has intake openings in an upper portion defined by the upper screen 43 and outlet openings in a lower portion thereof defined by the lower screen 43, whereby the outlet openings of the container deliver treated water to the interior volume of the bottom portion 12 and the treated water flows out of the interior volume of the bottom portion 12 through the treated water outlet opening 26 of the bottom portion.

Figure 7:
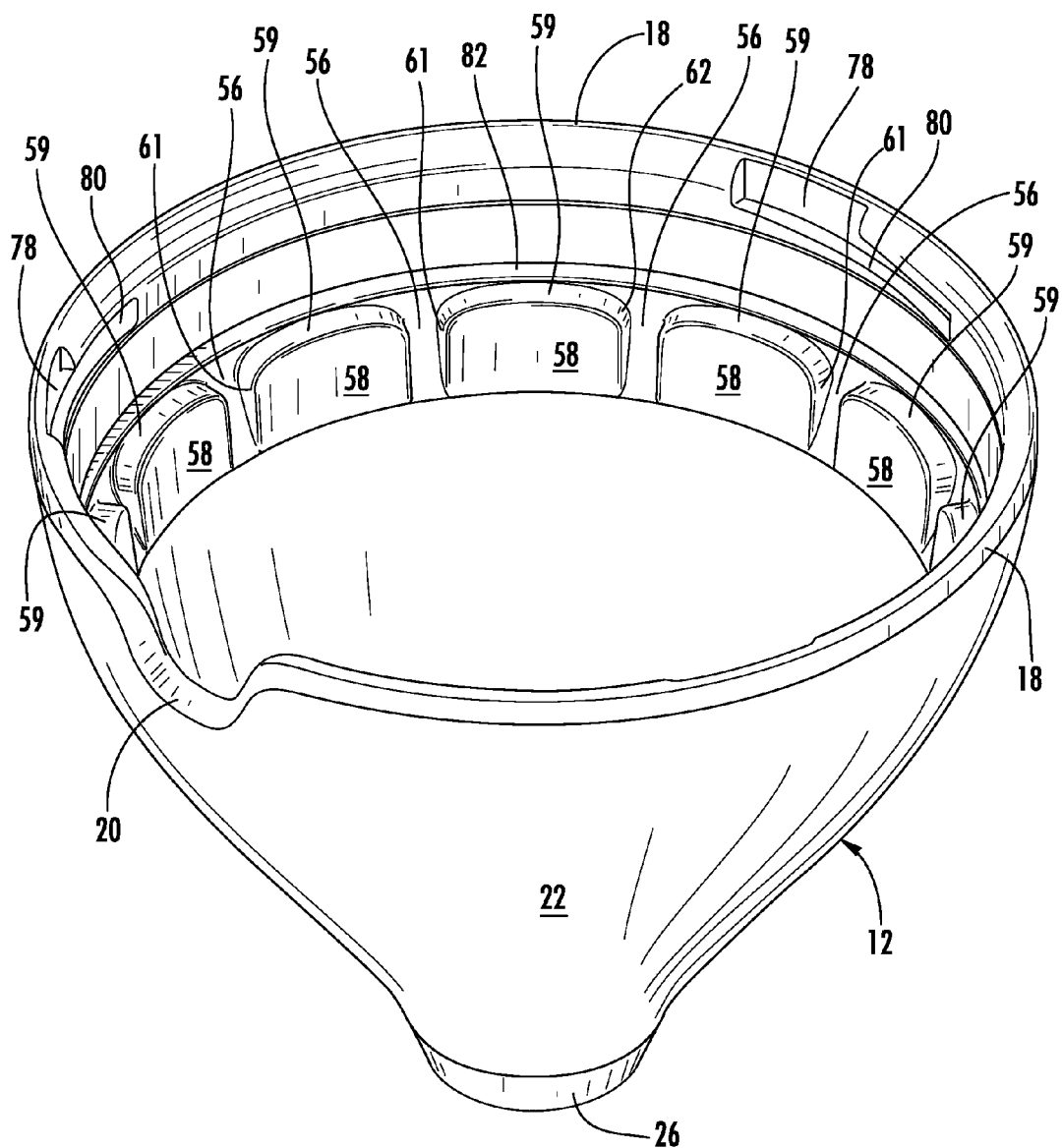
FIG. 7 is a front perspective view of the bottom funnel portion of a drop-shaped gravity filter assembly according to an aspect of the present disclosure.
Figure 8:
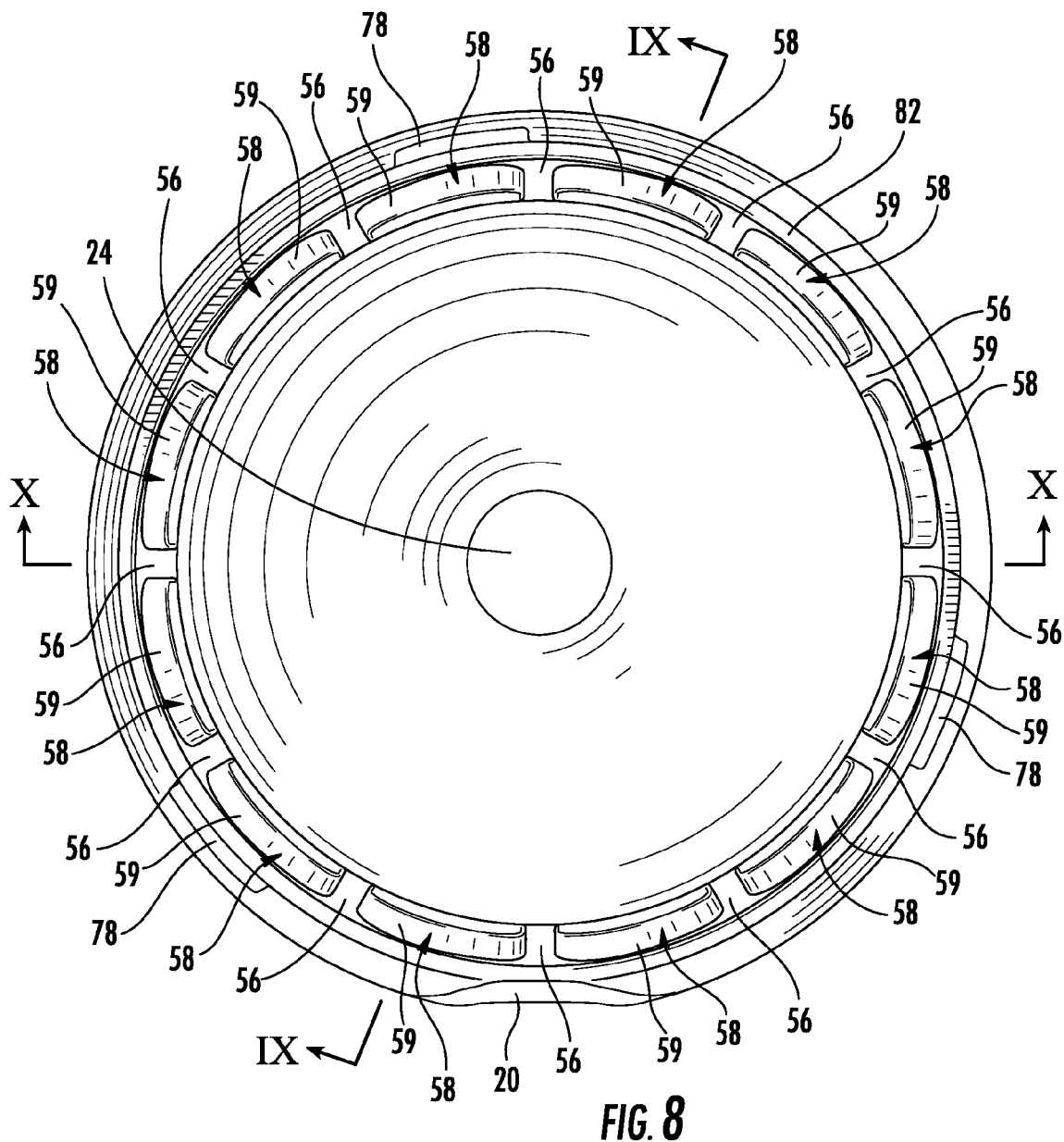
FIG. 8 is a top view of the bottom funnel portion according to an aspect of the present disclosure.
Figure 9:
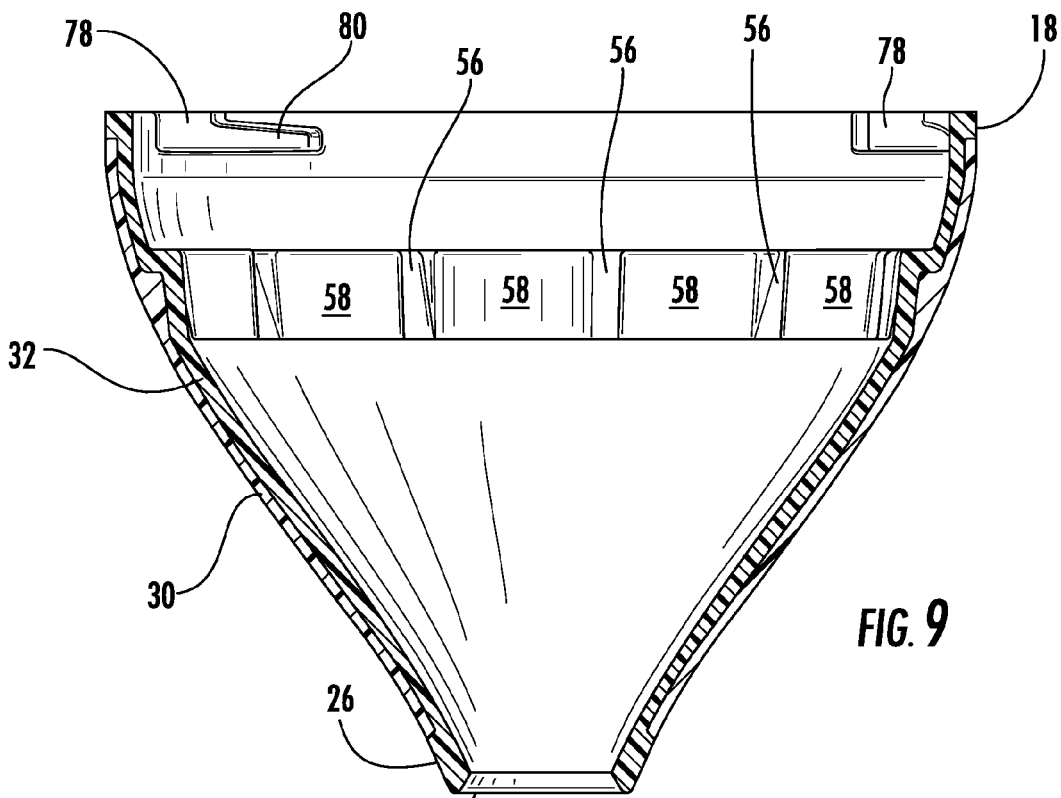
FIG. 9 is a cross-sectional view of the bottom funnel portion taken along lines IX-IX in FIG. 8.
Figure 10:
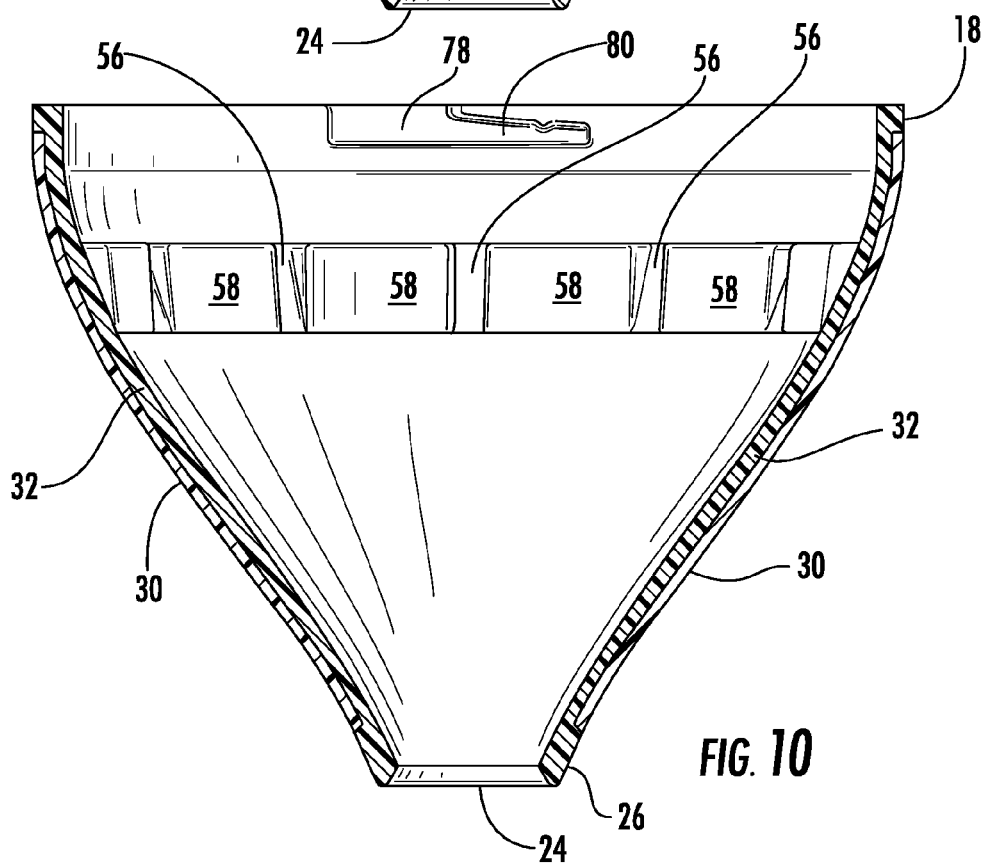
FIG. 10 is a cross-sectional view of the bottom funnel portion taken along lines X-X in FIG. 8.
Figure 15:
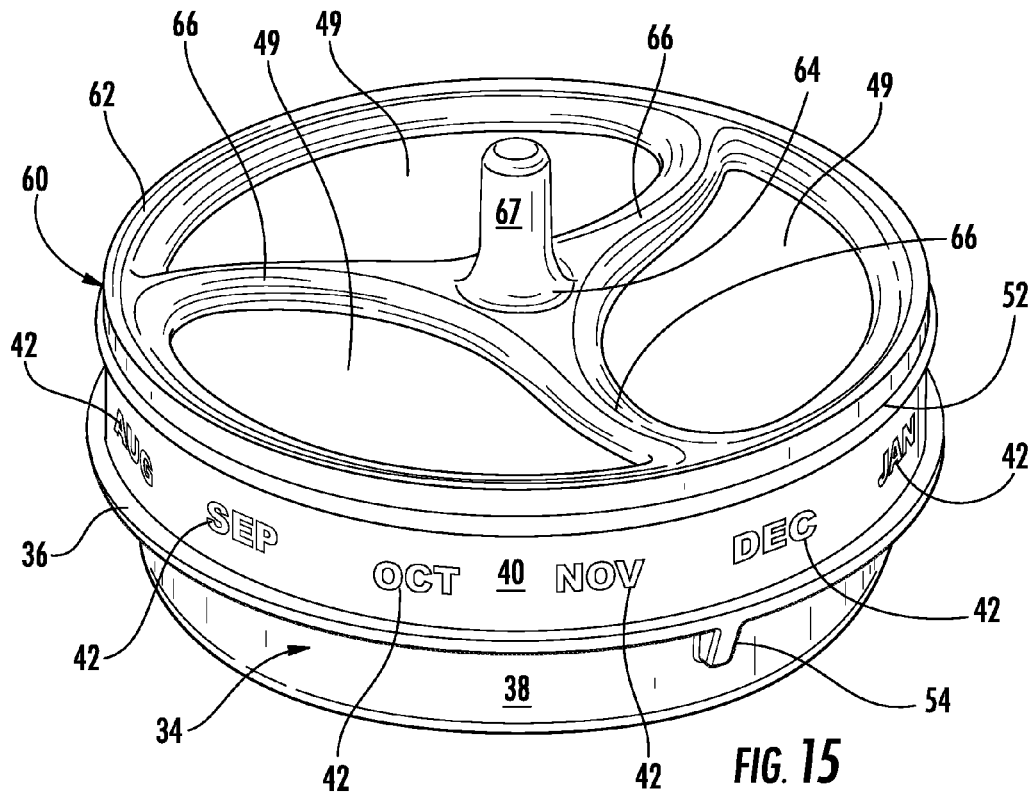
FIG. 15 is a front perspective view of the filter of the drop-shaped gravity filter assembly according to an aspect of the present disclosure.
Figure 16:
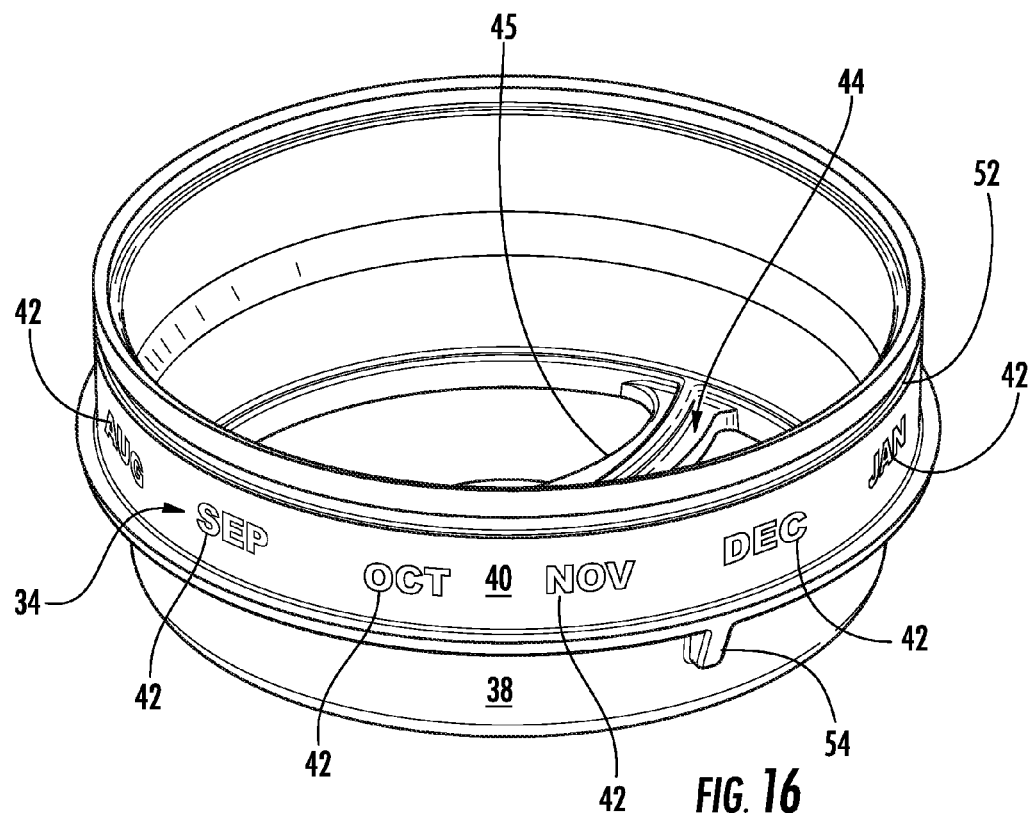
FIG. 16 is a front perspective view of the filter according to an aspect of the present disclosure with the top filter media retention element removed showing the interior of the filter.
Figure 15A:
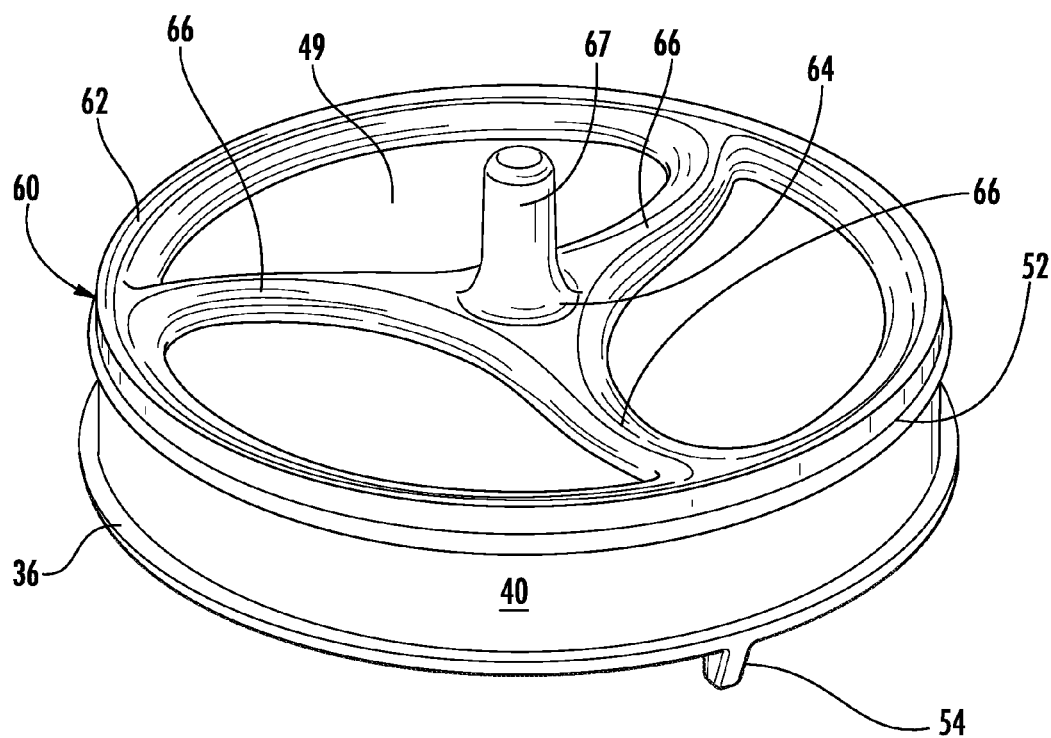
FIG. 15A is a front perspective view of the filter of the drop-shaped gravity filter assembly according to another aspect of the present disclosure.
Figure 16A:
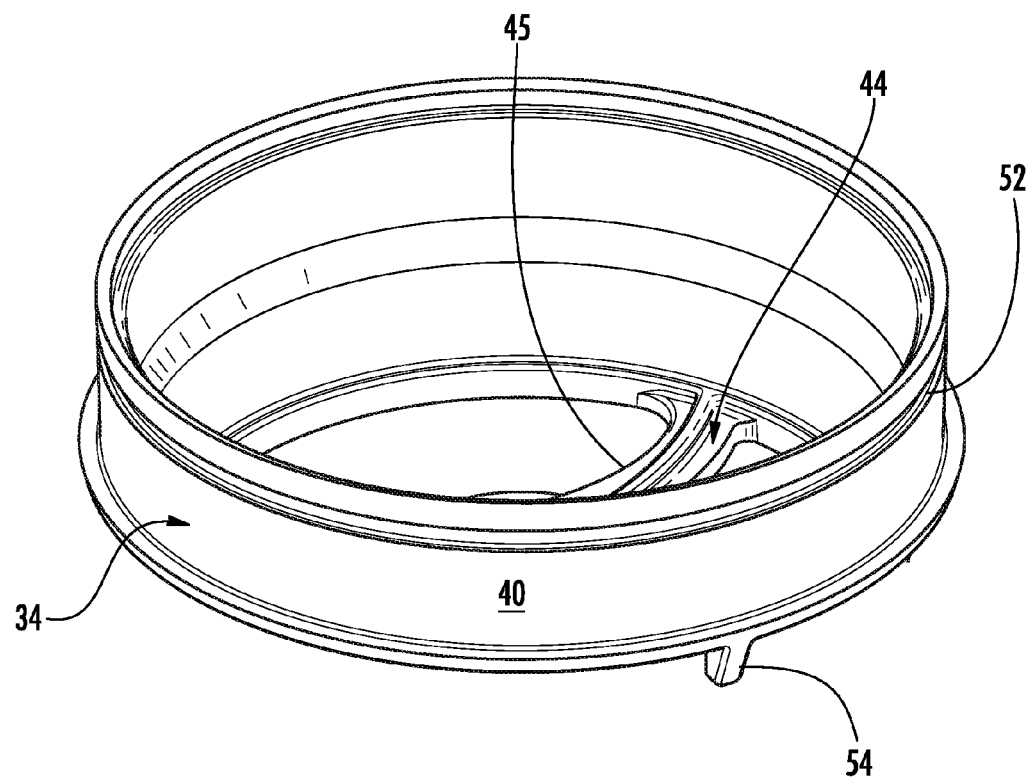
FIG. 16A is a front perspective view of the filter according to another aspect of the present disclosure with the top filter media retention element removed showing the interior of the filter.
Figure 17:
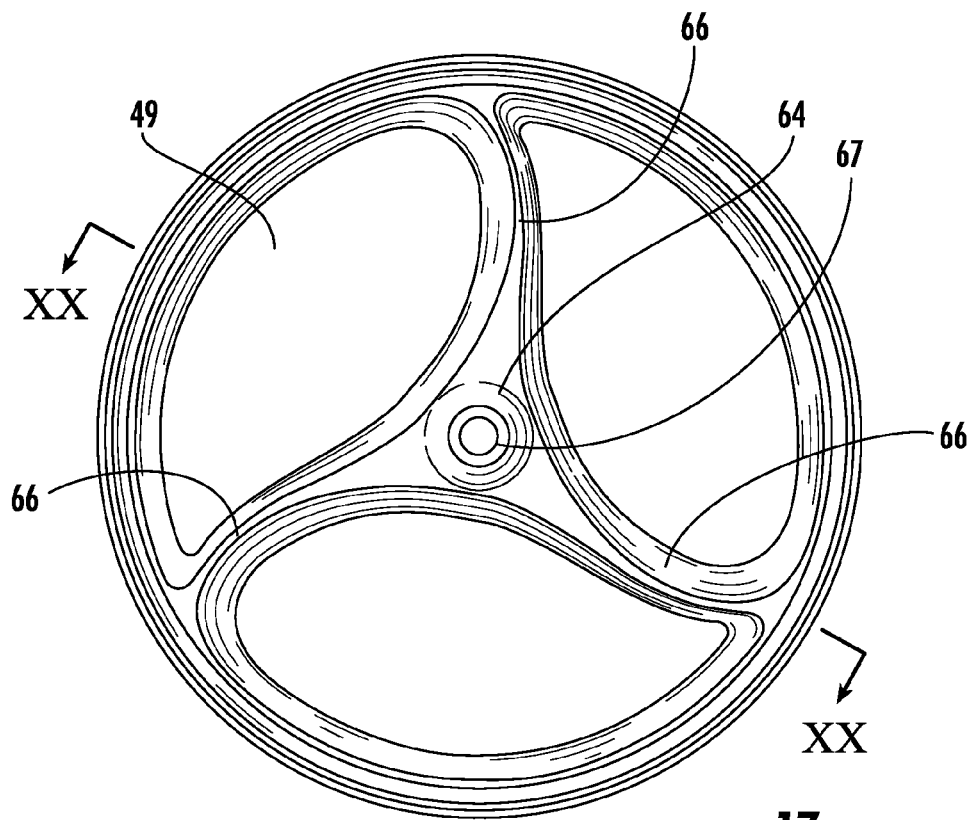
FIG. 17 is a top view of the filter according to an aspect of the present disclosure.
Figure 18:
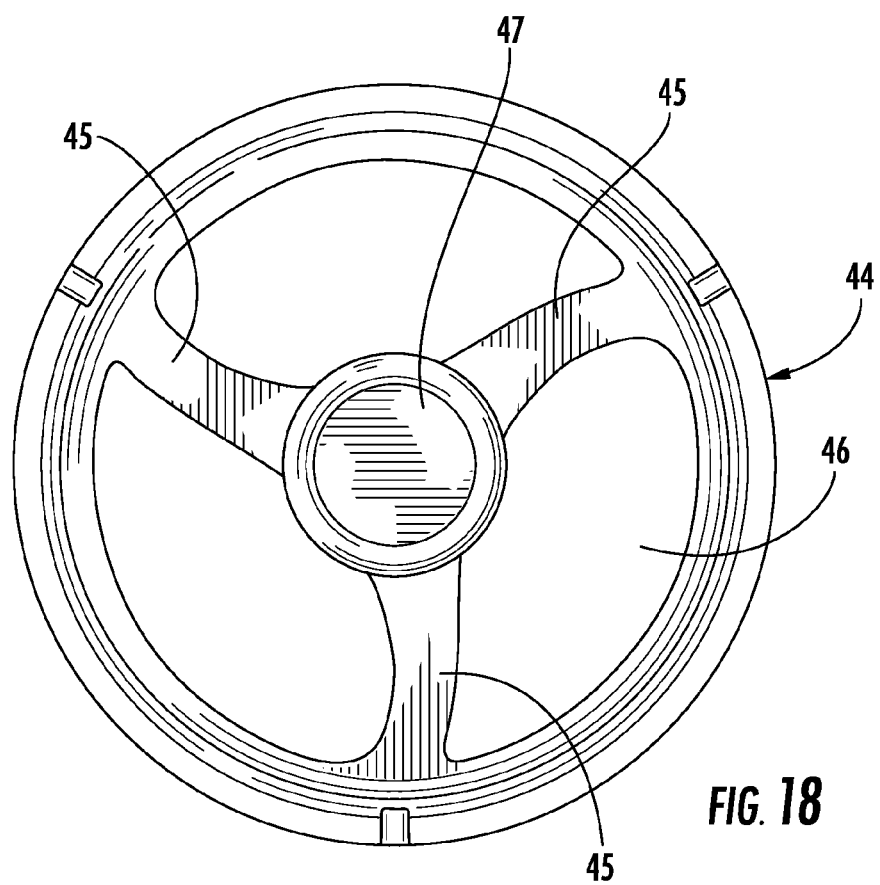
FIG. 18 is a bottom view of the filter according to an aspect of the present disclosure.
Figure 19:
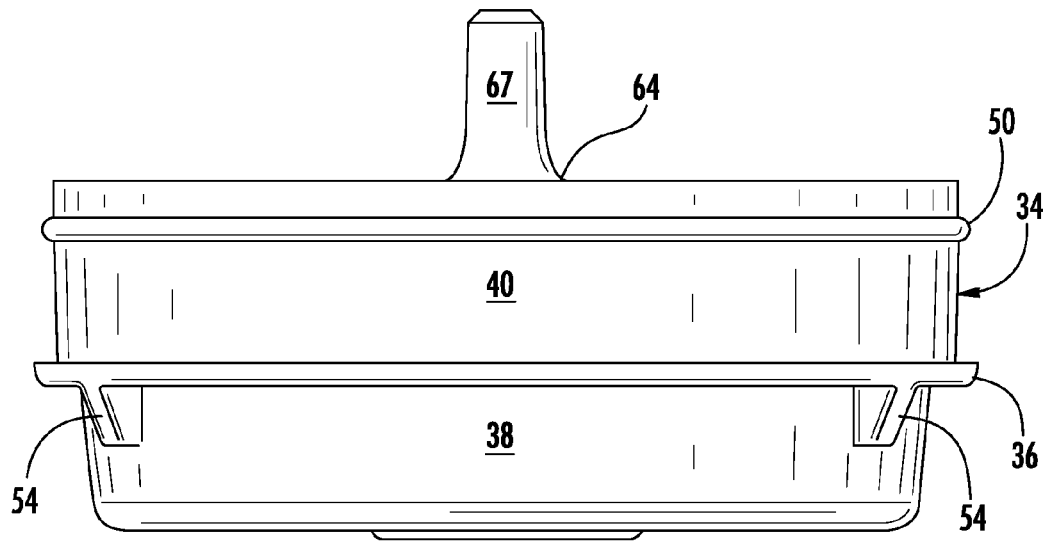
FIG. 19 is a side view of the filter according to an aspect of the present disclosure.
Figure 20:
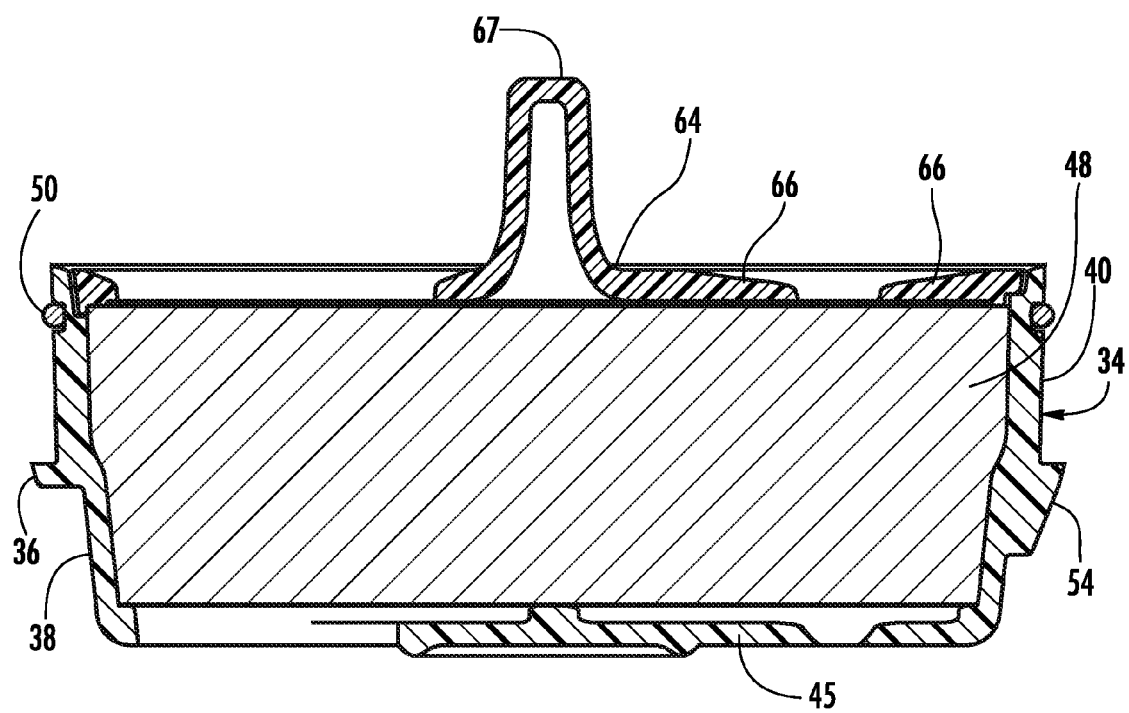
FIG. 20 is a cross-sectional view of the filter shown in FIG. 19 according to an aspect of the present disclosure taken along lines XX-XX in FIG. 17.
Figure 19A:
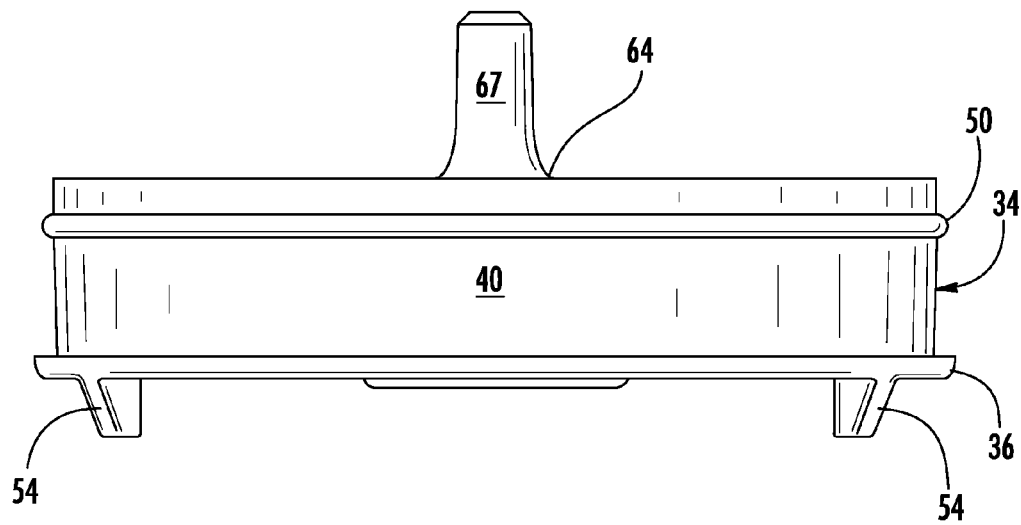
FIG. 19A is a reduced height version of the filter of FIG. 19.
Figure 20A:
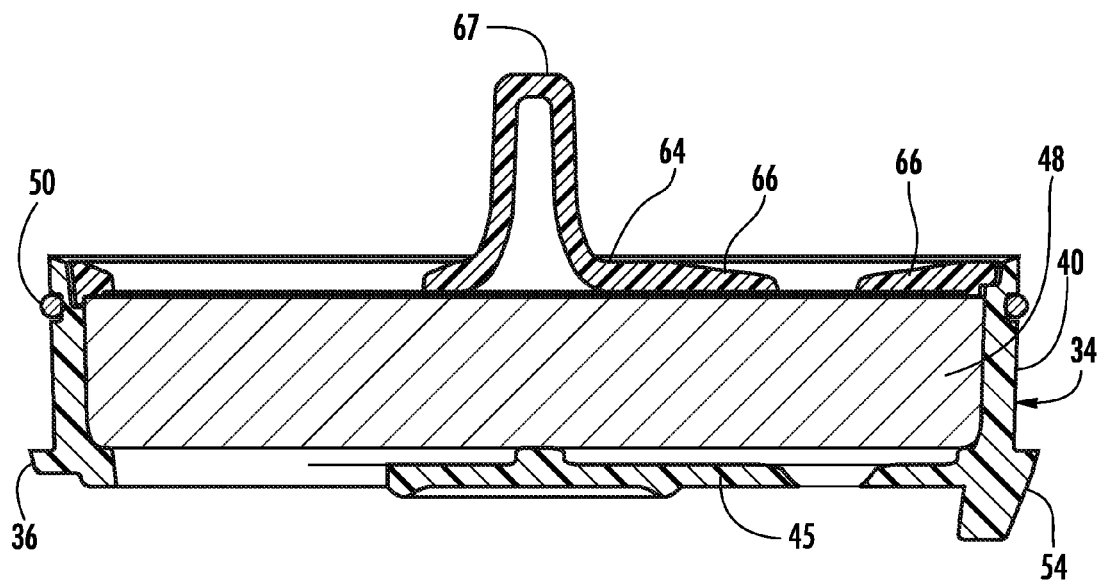
FIG. 20A is a cross-sectional view of the filter of FIG. 19A.
Figure 21:
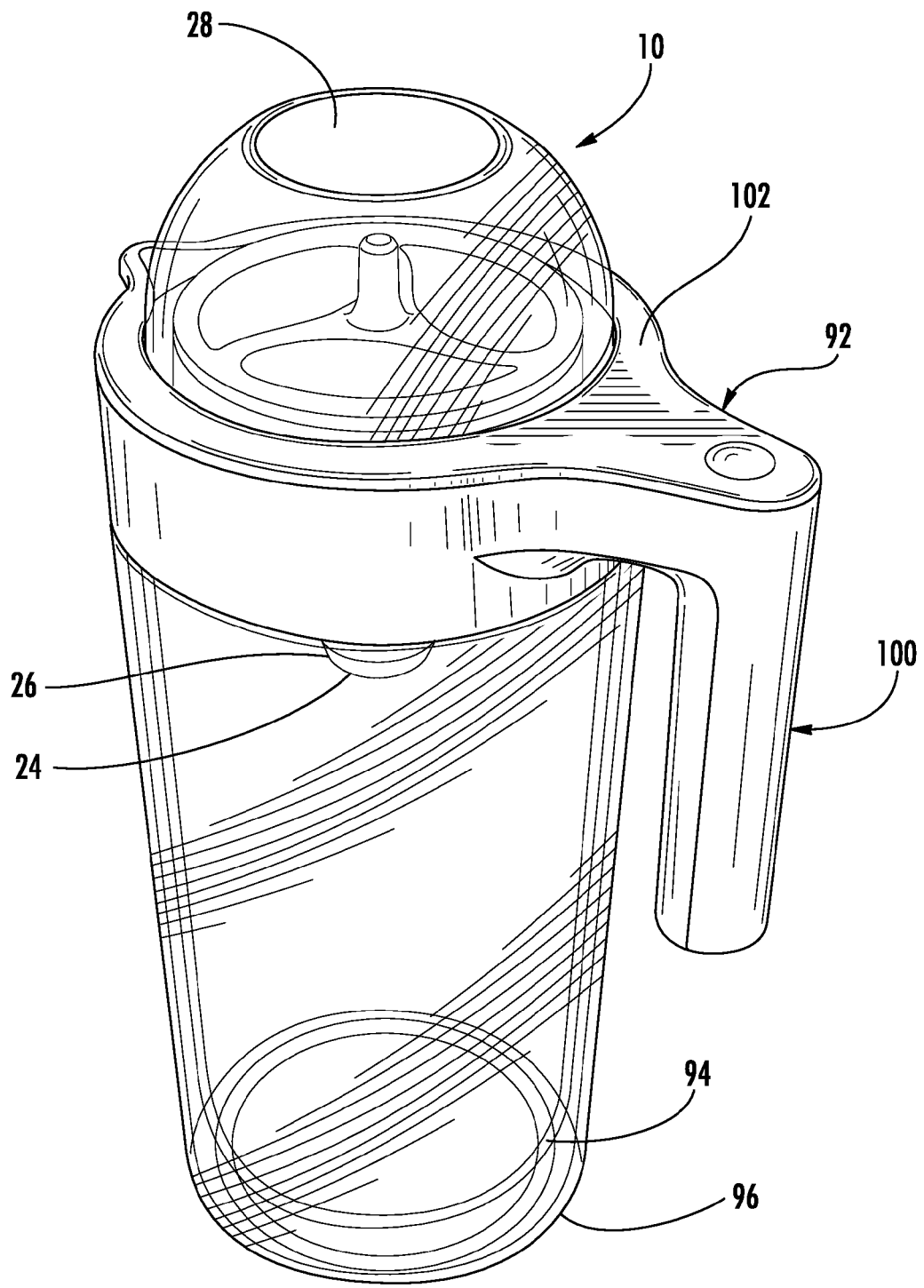
FIG. 21 is a perspective view of a drop-shaped gravity filter assembly according to an aspect of the present disclosure, positioned within the lid of a pitcher.
Figure 22:
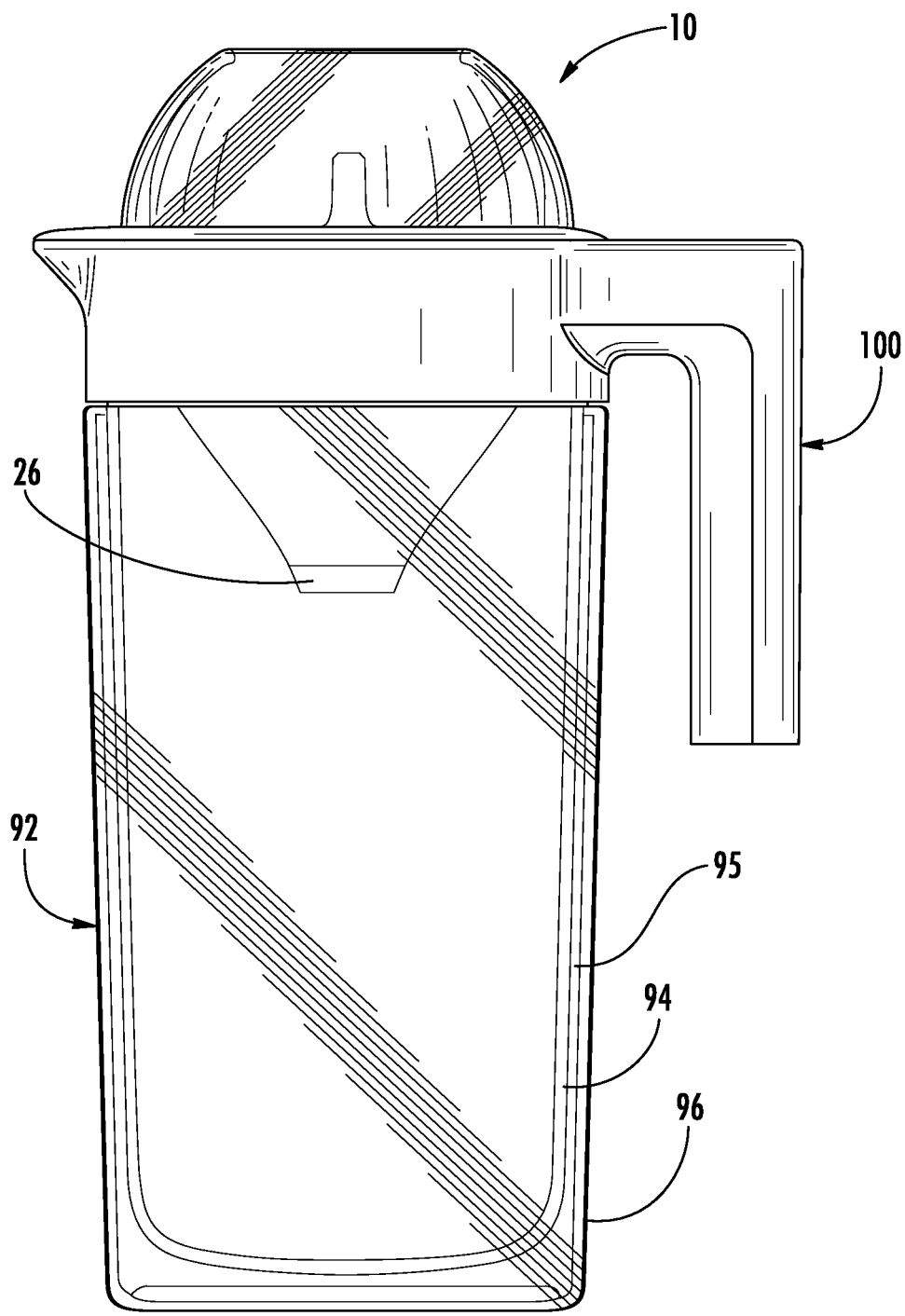
FIG. 22 is a side elevational view of a drop-shaped gravity filter assembly positioned within a pitcher.
Figure 23:
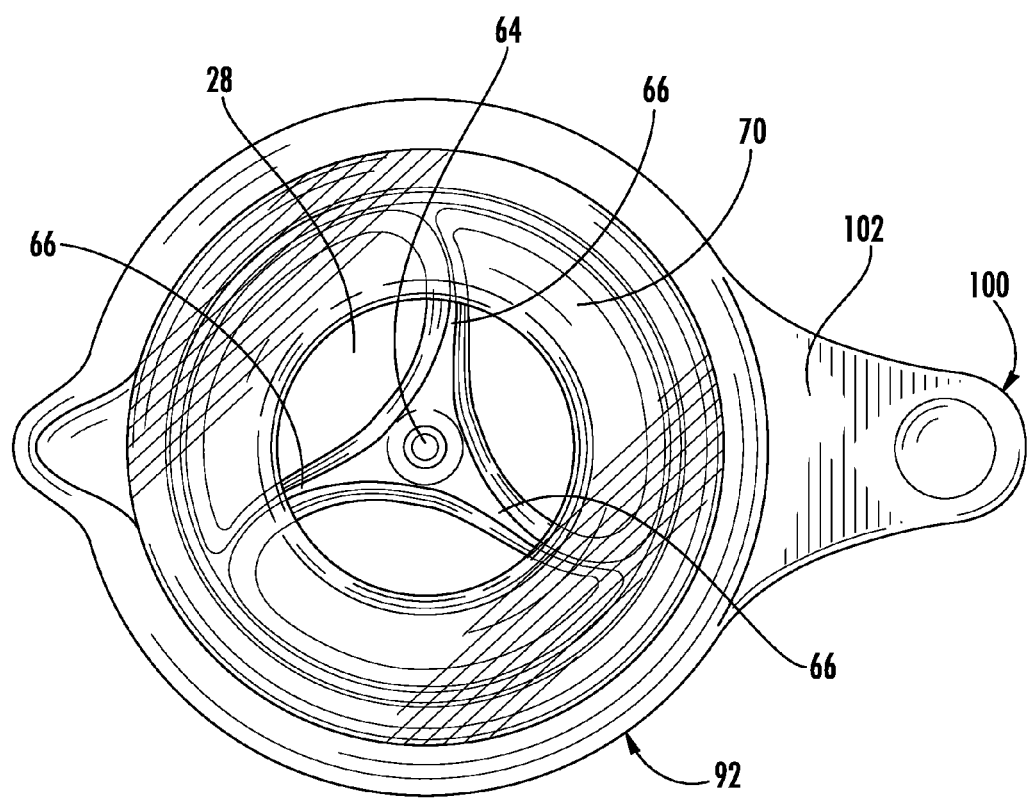
FIG. 23 is a top view of a drop-shaped gravity filter assembly positioned within a pitcher.
Figure 24:
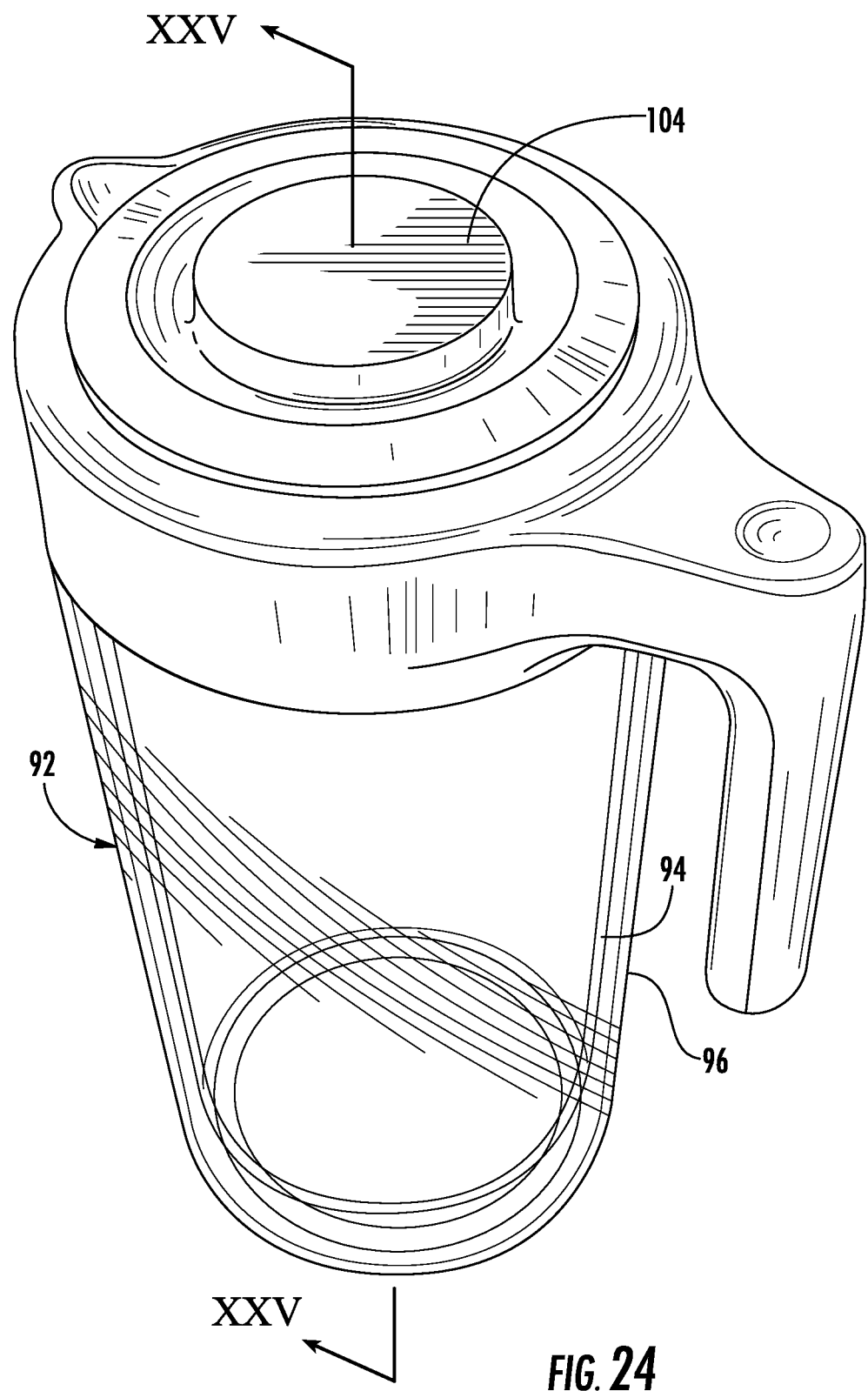
FIG. 24 is a perspective view of the pitcher with a standard lid within the cap aperture in the drop-shaped gravity filter assembly according to an aspect of the present disclosure removed from the cap aperture.
Figure 49:
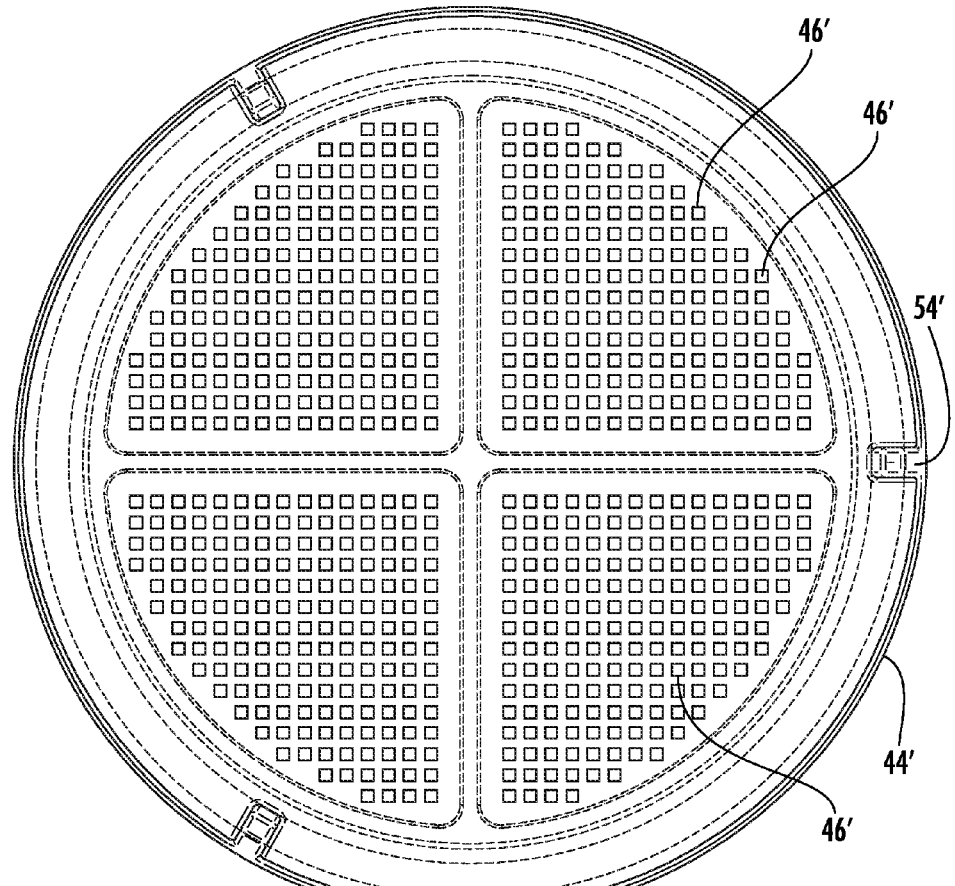
FIG. 49 is a bottom view of the filter shown in FIG. 45.

The filter further typically includes a filter base 44, which may be spoked (reference numeral 45) about a hub 47, FIG. 18, or have a sufficient number and/or sized apertures 46 (or 46' in FIGS. 49-51) to allow water flow at a rate faster than the water flow through the filter material 48, which may be a permeable or porous, loose or a more compressed filter media. The filter base 44 can be a separate component that is engaged with the side wall section 34 or the filter base may be integrated with the side wall section as a single component. An O-ring 50 or other typically elastomeric material is spaced within a channel 52 in the upper portion 40 or atop the upper portion 40 of the filter side wall 34. The bottom portion 38 of the filter side wall 34 also typically includes at least one, but more typically a plurality, and most typically about three downwardly projecting tabular members 54. These tabular members are matingly received within spaces 56 between the interior projecting members 58, which are typically wedge-shaped members or are human incisor teeth-shaped and project into the interior of the bottom funnel portion 12 per FIG. 7. The interior projection members have an upper shelf 59 that extends into the interior of the bottom funnel portion as well as tapered sides 61 extending down toward the liquid outlet 24 (see FIGS. 7 and 8). This somewhat lock-and-key-type engagement, where the tabular members 54 are seated at least partially, more typically fully, within the spaces 56, between the filter 16 and the funnel portion 12 facilitates the secure, but easy engagement and disengagement of the filter by hand and without the use of tools with the bottom portion 12 without being threadably engaged with one another. The engagement also facilitates the engagement of the filter with the bottom filter portion in such a manner that the appropriate indicator, when employed, shows through the cutout portion and that only purposeful adjustment of the filter within the funnel will change the indicator when viewed through the cutout portion 20. As mentioned above, different height versions of the filter 16 are possible. In particular, a tall version as described above with indicators 42 arranged on side wall surface 34 as shown in FIGS. 15 and 16 and a shortened version without side wall section 38 and indicators 42 arranged on side wall surface 34 as shown in FIGS. 15A, 16A, 19A, and 20A.

The filter also typically has a filter top 60 that seals the filter material 48 within the overall filter 16. The filter top 60 typically a circular perimeter and typically has a perforated structural section 62 that is typically sized and shaped to fit within the side wall section 34 and rim 68 of the top cap portion 14. The perforated structural section is joined (shown, using spokes 66) with a hub 64, which typically is centrally located and has an upwardly projecting spindle 67 to facilitate it being grasped by a user. The perforated structural section allows for fluid, typically water, to flow through apertures 49 in the filter top and into engagement with the filter material 48 to allow the water or other fluid to be treated by the filter material.

Figure 11:
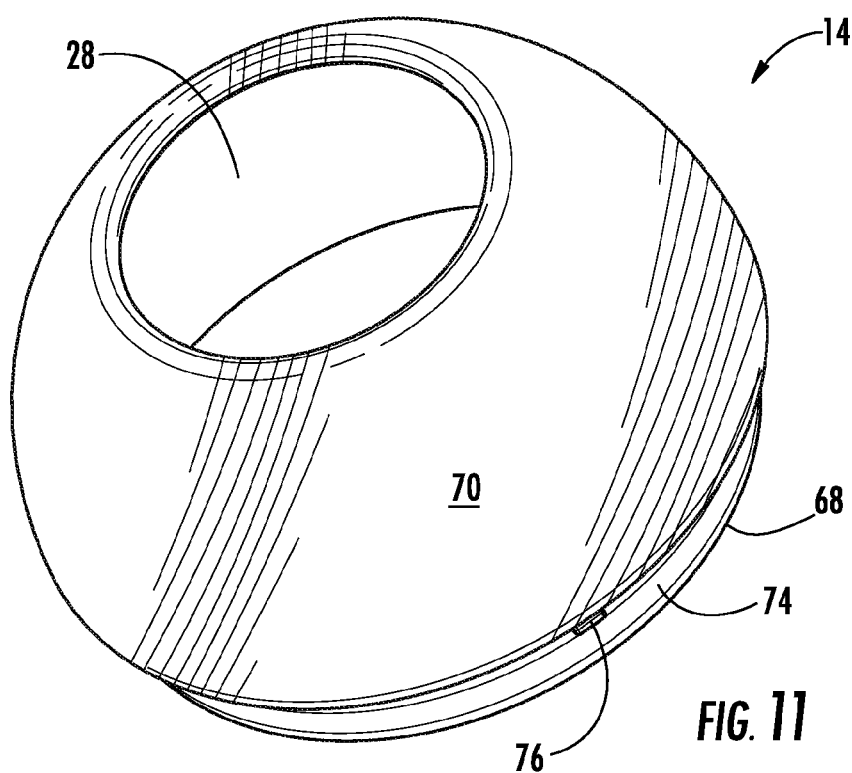
FIG. 11 is a perspective view of the top cap portion of a drop-shaped gravity filter assembly according to an aspect of the present disclosure.
Figure 12:
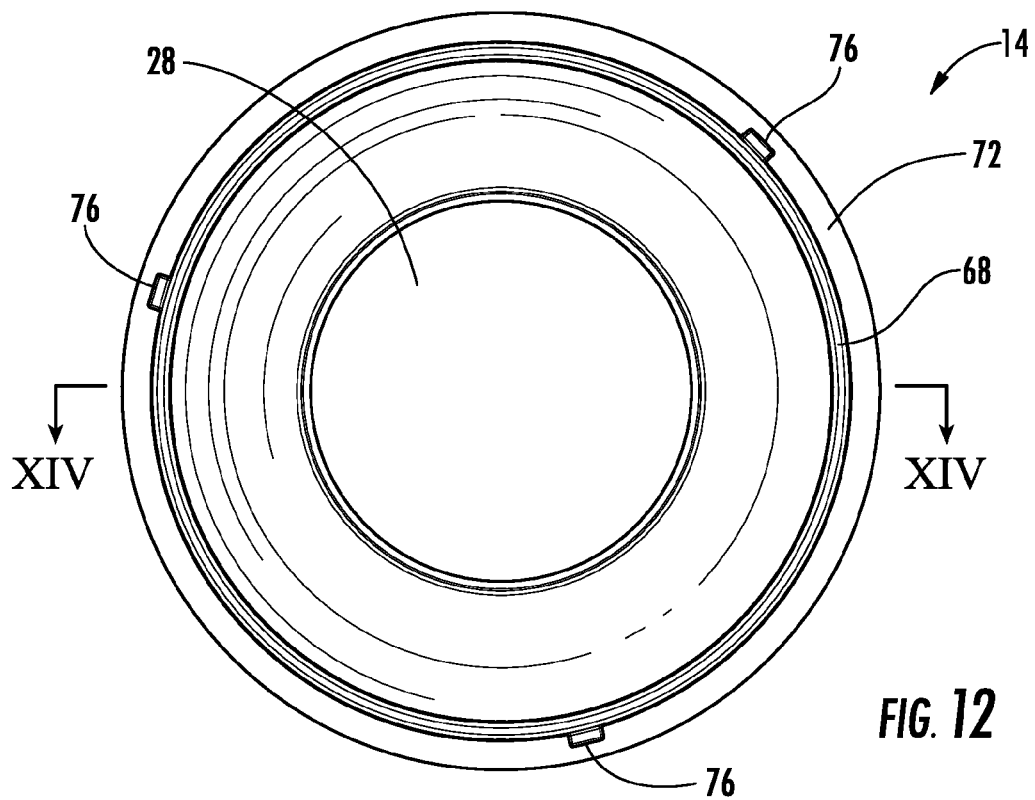
FIG. 12 is a bottom view of the top cap portion of a drop-shaped gravity filter assembly according to an aspect of the present disclosure.
Figure 13:
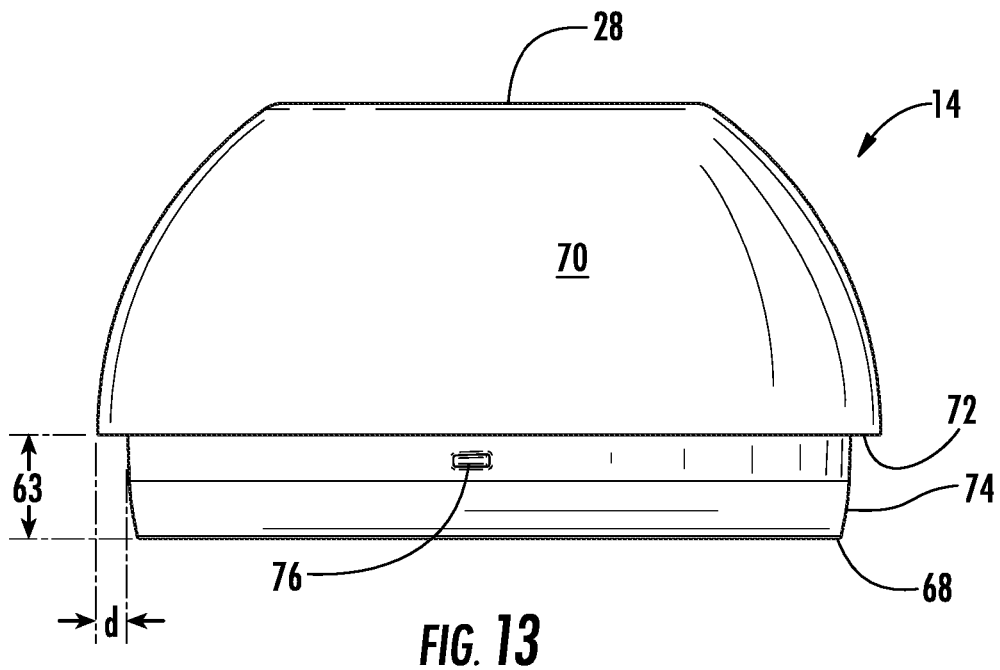
FIG. 13 is an elevated side view of the top cap portion according to an aspect of the present disclosure.
Figure 14:
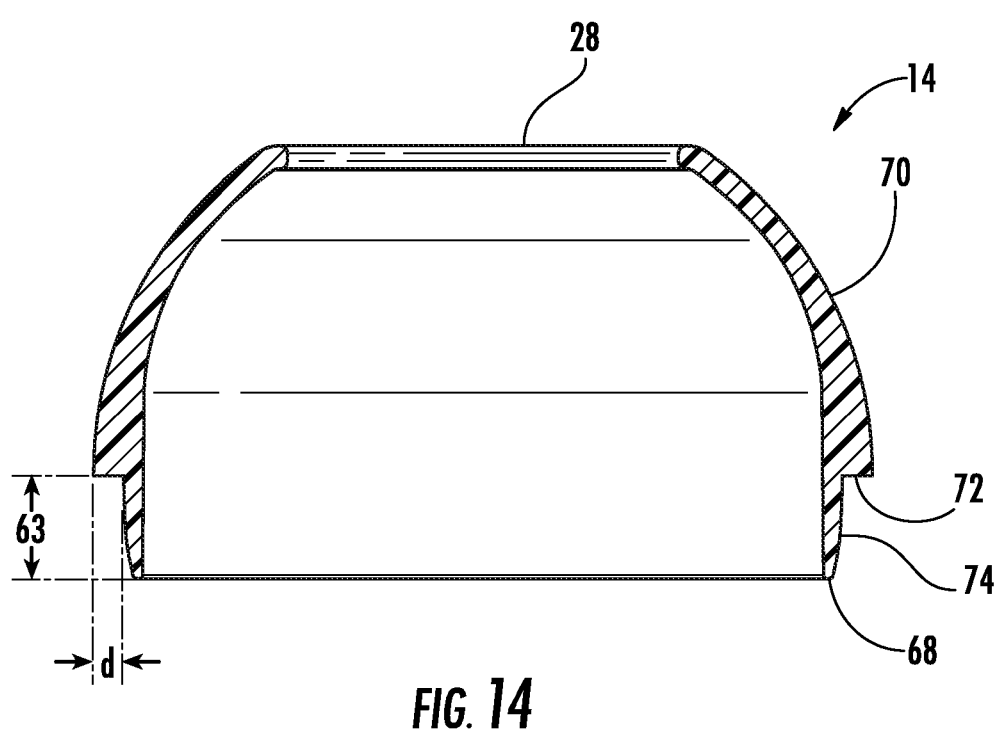
FIG. 14 is a cross-sectional view of the top cap taken along lines XIV-XIV in FIG. 12.

The perimeter rim section 63 of the top cap portion 14 is typically indented a specific distanced from the outer curved wall portion 70 such that the outer curved wall portion mates with the bottom funnel portion 12 outside surface 22 and creates an at least substantially contiguous surface such that the exterior of the gravity filter assembly appears to be a smooth surface when assembled. The indented distanced creates a lip 72. As shown in FIGS. 5, 5A, 11, 12 and 13, the perimeter rim section 63 outer surface 74 typically includes at least one, more typically a plurality of, and most typically about three slanted elongated members 76 that extend away from the outer surface 74 and are received in gaps 78 in the interior surface of the bottom funnel portion such that when the top cap portion is engaged with the bottom funnel portion and rotated, the elongated members 76 slide into engagement with the grooves 80 to retain the two in engagement with one another, but still allowing the two pieces to be disengaged and reengaged with one another by hand and without the use of tools. Alternative versions of the engagement members are shown in FIGS. 11-13, which show the members 76 that are smaller, more rectangular prism shaped members that may or may not be slanted. They are shown not slanted.

The interior of the bottom portion 12 also typically has an interior shelf 82 (see FIG. 7) that receives the lip 36 of the side wall of the filter 16 and engages the bottom surface of that lip 36. The top surface of the lip 36 typically engages the funnel engaging rim 68.

The at least one medium 48 is typically a filter medium, but conceivably could add components to the fluid (typically water) flowing through, or otherwise, into contact with the at least one medium 48. As discussed later in more detail, this could include chlorine or other halogens. Typically, the at least one medium is a filter medium 48. The medium is positioned within the filter 16 and may include: (1) material configured to treat water, especially water for human consumption, chosen from a treatment group consisting of filtering particulate matter from the water; (2) material that adds a descaling agent to the water, vitamins to the water, minerals to the water, and/or one or more pharmaceutically active agent(s); (3) material that removes specific soluble organic or in-organic elemental compounds and thus improves the taste of the water, removes odor from the water, and alters the color of the water; (4) reduces concentrations of heavy metals, pesticides, volatile organic compounds, specific pharmaceutically active agents; (5) removes cysts and micro-organisms; (6) adding a halogen such as bromine, iodine, chlorine compounds as a disinfectant agent to the water; (7) conditions the water such as softening through use of ion exchange resins or ALUSIL™ (an aluminosilicate) to change the chemical structure of calcium chloride in solution to reduce scaling deposition; or (8) combinations of any or all of the above materials.

The descaling agents that may be added to the fluid by the treatment medium may be chosen from the group consisting of organic acid, inorganic acid, sulfonic acid, carboxylic acid, lactic acid, acetic acid, formic acid, oxalic acid, uric acid, phosphoric acid, hydrochloric acid, sulfamic acid, and mixtures thereof. The water treatment medium contained in the filter may also be chosen from the group consisting of: carbon (e.g., activated carbon particles, such as mesoporous activated carbon, carbon powder, particles sintered with a plastic binder, carbon particles coated with a silver containing material, or a block of porous carbon); ion exchange material (e.g., resin beads, flat filtration membranes, fibrous filtration structures, etc.); zeolite particles or coatings (e.g., silver loaded); polyethylene; charged-modified, melt-blown, or microfiber glass webs; alumina; aluminosilicate material; and diatomaceous earth. The water treatment medium may also be impregnated or otherwise disposed on a porous support substrate, such as a fabric material, a paper material, a polymer screen, or other conceivable porous structures that may be contained in the filter.

The water treatment medium 48 typically allows a water flow rate of at least approximately one to two liters per minute. The medium typically also reduces chlorine, taste and odor components (CTO) per NSF 42 to minimum of 60 gallons and Atrazine, Benzene, Alachlor and Lindane per NSF 53 for minimum of 60 gallons. The filter medium 48 also typically removes lead, copper, mercury, cadmium and arsenic (pH 6.5 per NSF 53 2004 standard) for up to 60 gallons, sfd. Media from Selecto described in U.S. Pat. Nos. 6,241,893 and 6,764,601, the disclosures of which are hereby incorporated by reference in their entirety, may be used. The filter medium does not typically require any presoaking and does not typically contain any carbon fines, in particular carbon fines that might find their way to the treated water, which often occurs when current carbon based gravity filters are used.

Figure 25:
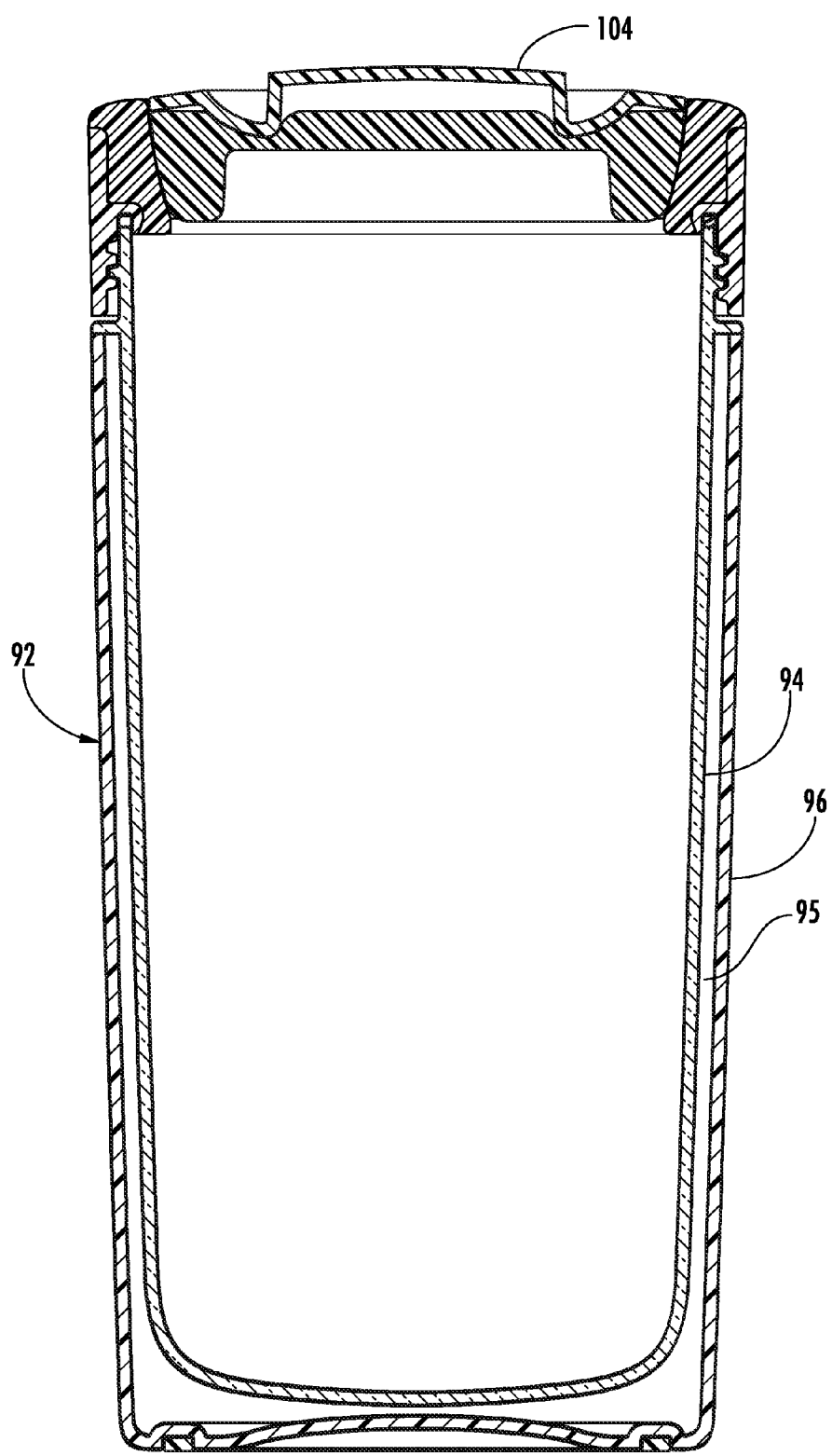
FIG. 25 is a cross-sectional view taken along line XXV-XXV in FIG. 24.
Figure 26:
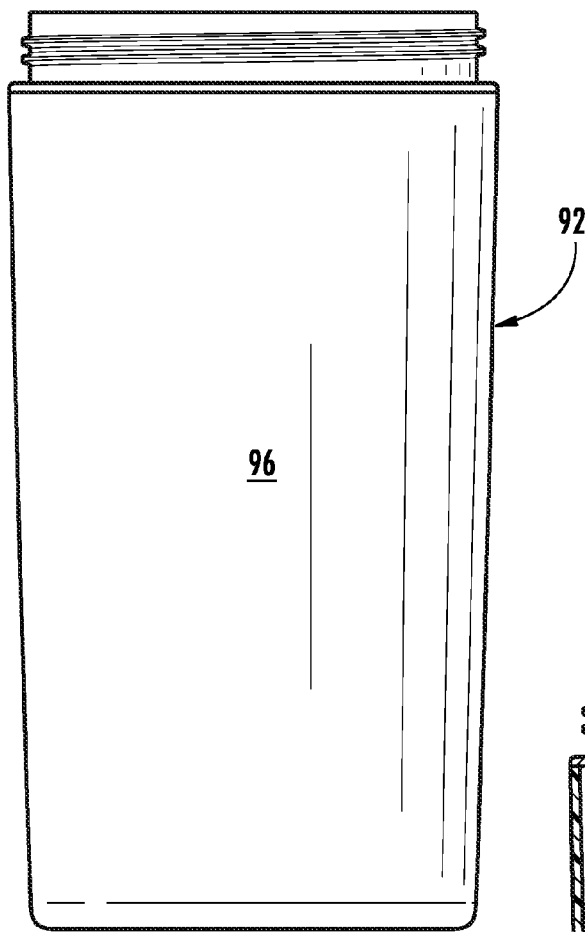
FIG. 26 is an elevated view of the container portion of a pitcher according to an aspect of the present disclosure.
Figure 27:
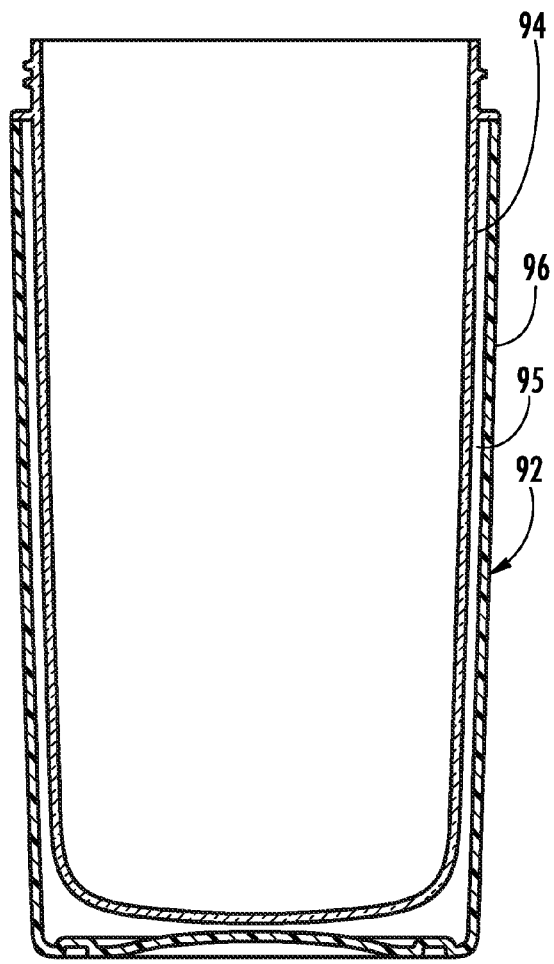
FIG. 27 is a cross-sectional view of the container portion of the pitcher of FIG. 26.
Figures 28, 29:
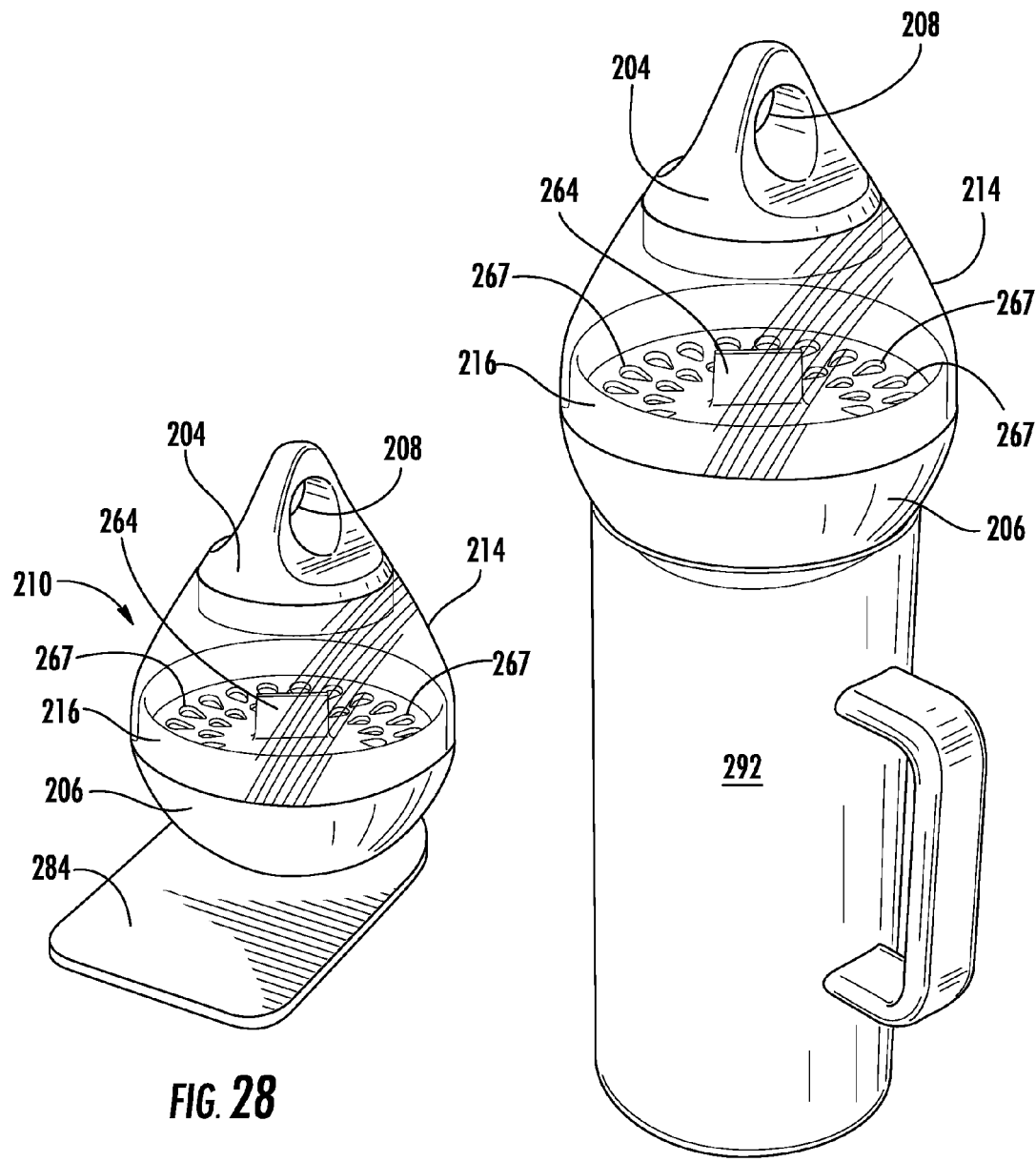
FIG. 28 is a perspective view of a drop-shaped gravity filter assembly according to another aspect of the present disclosure seated within a stand.
FIG. 29 is a perspective view of a drop-shaped gravity filter assembly of the present disclosure seated within a vessel such as a beverage container or pitcher.

As shown in FIG. 21-27, the gravity filter assembly 10, which is typically a drop-shaped gravity filter, may be seated within the center section of the cap of a liquid vessel 92, which is shown as a pitcher in the Figures. The water pitcher is typically a single or double walled pitcher. FIGS. 21-27 show a double walled pitcher with a continuous wall, but could also be constructed of more than one single walled or double walled side wall such that the pitcher may have a non-continuous constructions, for example a four wall construction where each wall is a single walled or double walled side wall. Such a construction would have a rectangular cross-section. The double walled pitcher may have an interior liquid storage/receiving volume defining wall/section 94 and an exterior defining section 96 with a space 95 therebetween. The interior volume defining wall section and the exterior defining wall section may be constructed of the same or different materials. While plastic pitchers with both the interior volume defining wall and exterior defining section (as well as optionally the other components such as the handle 100, top 102, which may be threadably or otherwise repeatedly removably engageable and disengagable from the pitcher by hand and without the use of tools (see FIGS. 25-27), and lid 104) may be used, typically the interior volume defining wall 94 is a composite or single material that is a more preferred material to contact filtered water such as glass, stainless steel, gold or silver coating. As shown in FIGS. 25-77, the potable water pitcher includes top member 102 (see FIG. 21) defining a water receiving aperture opening configured to allow a potable water to be delivered into an interior water storage volume, wherein the interior water storage volume is defined by at least one upwardly extending wall 94, 96 extending upward from a base (see FIG. 25). The top member has a radially inner surface that is threaded at a lower end thereof, and the upwardly extending wall has a radially outer surface that is threaded at an upper end thereof, wherein threads on the top member are threaded to the threads on the upwardly extending wall (see FIG. 25), and wherein the water receiving aperture opening is frictionally engaged by said bottom portion side wall of the bottom portion of the gravity-driven water filtration system (see FIG. 22. When a single walled pitcher is used (see, for example. FIG. 34), the interior filtered water facing surface may be plated or applied to a portion(s), substantially all, or all of the interior filtered water facing surface with the materials mentioned above. The double walled pitcher (see, for example. FIG. 33) may also be constructed of glass and constructed using a glass process that is either spun welding of two pieces together blow formed or other controlled process that forms such a double walled pitcher of glass. For a single or double walled construction the glass can be blow-molded or vapor deposited onto another media such as plastic or metal thereby forming a bilayer composite material. Either or both the interior volume defining wall section 94 and the exterior defining wall section 96 may be entirely glass or may be plastic with a layer of glass on the water-contacting surface in the case of the interior volume defining wall section 94 or the exterior, user facing surface of the exterior defining wall section 96. Such a construction lightens the weight of the overall pitcher while using a more preferred material for both tactile or visual aesthetic and water contacting. When a plastic surface is allowed to contact the filtered water, the user may perceive taste variations.

The pitcher may also use an adapter instead of the drop shaped gravity filter assembly to filter water as shown in FIGS. 33-34. The adapter 98 may be a lid or other section that typically has a filter within the adapter and constructed to allow for water flow into the pitcher/vessel by allowing water to flow through the adapter and filter and into the water vessel. The filter 16a disposed within the adapter is a slightly modified version of the adapter 16 discussed above. In this embodiment, the side wall section may not be solid but rather have ribs or bars 106 that provide structural support between the filter base 44a and the filter top 60a.

Figure 30:
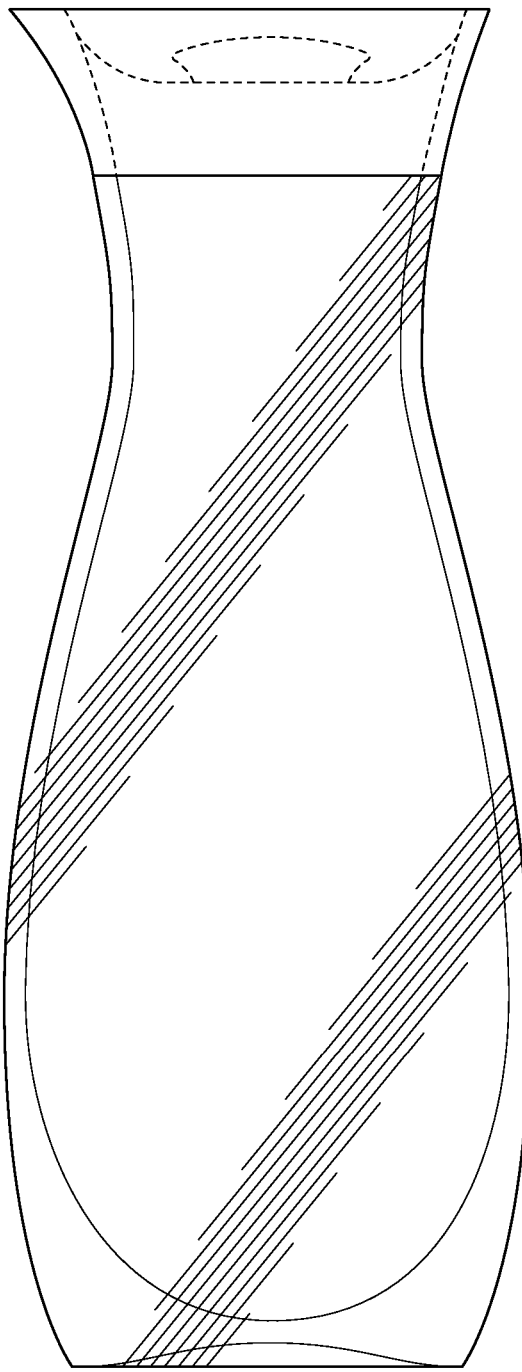
FIG. 30 is an elevated side view of a water pitcher according to an aspect of the present disclosure.
Figure 31:
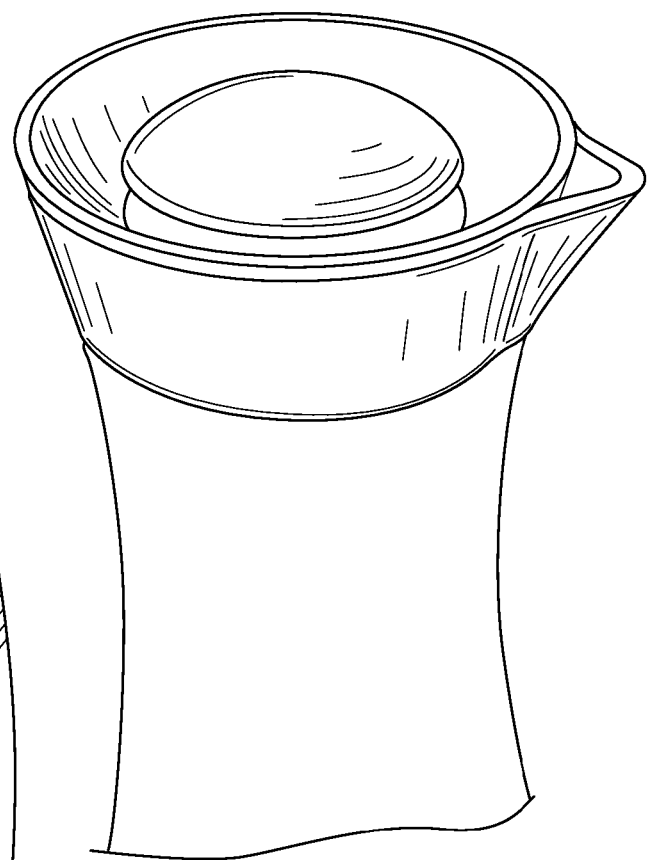
FIG. 31 is a perspective view of the top portion of the water pitcher of FIG. 30.

FIGS. 30-31 show an alternate water vessel of the present disclosure. The vessel is a double walled vessel as discussed above.

Figure 32:
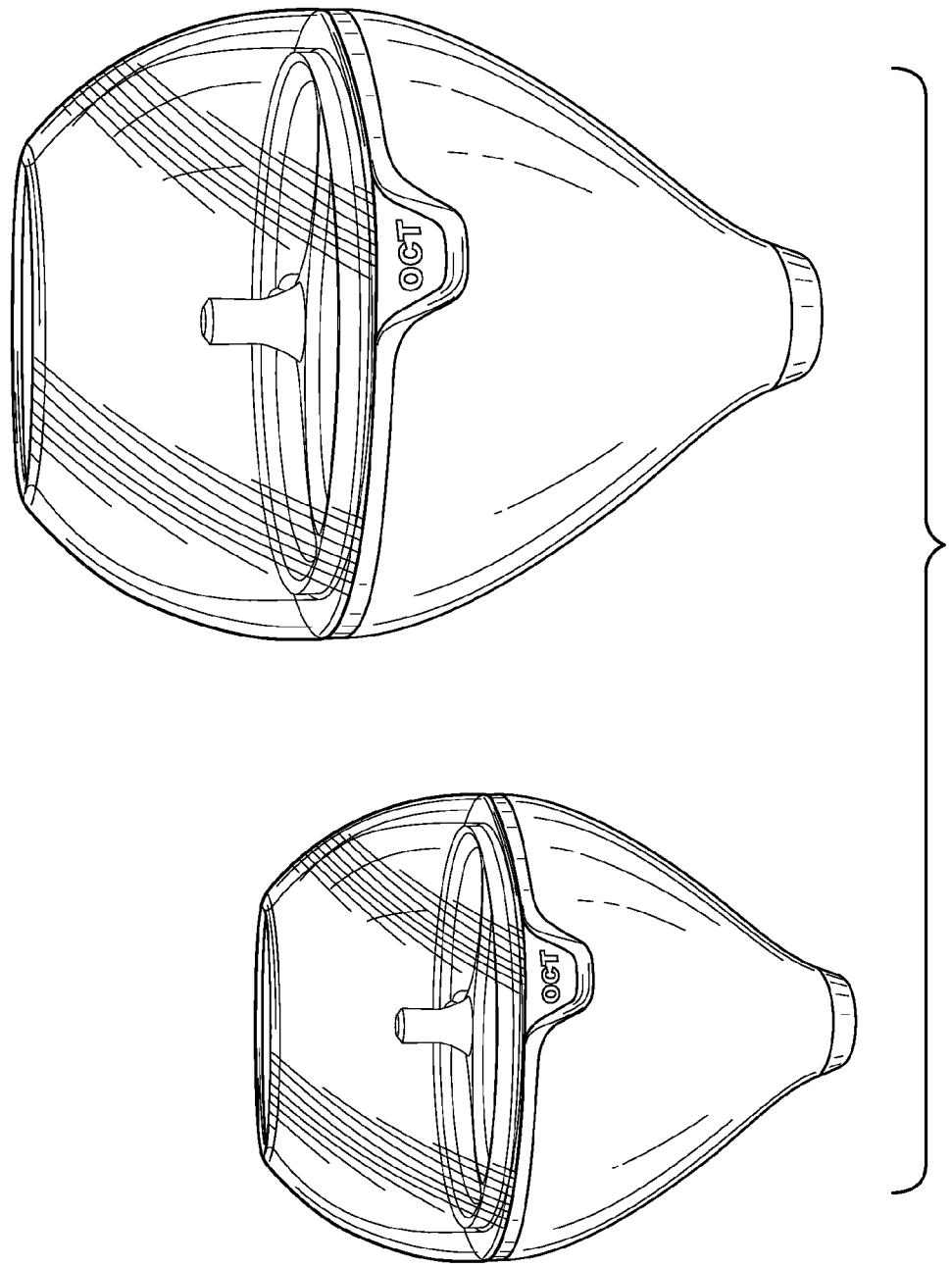
FIG. 32 is a perspective view showing alternatively sized drop-shaped gravity filters according to the present disclosure that are sized to fit variously sized vessel openings.

FIG. 32 shows that the drop-shaped gravity filter assembly 10 may be sized and configured to engage vessels with multiple different sized openings. The smaller filter on the left of FIG. 32 may be used to fill smaller vessels with treated fluids, typically water, and the larger filter on the right may be used to fill larger vessels. Filters of the present disclosure may be configured of any size. The filters may engage any size vessel. As shown in FIG. 32, the bottom portion side wall is a shaped surface configured to frictionally engage a plurality of differently sized water apertures and still deliver treated water through the treated water outlet opening.

Figure 35:
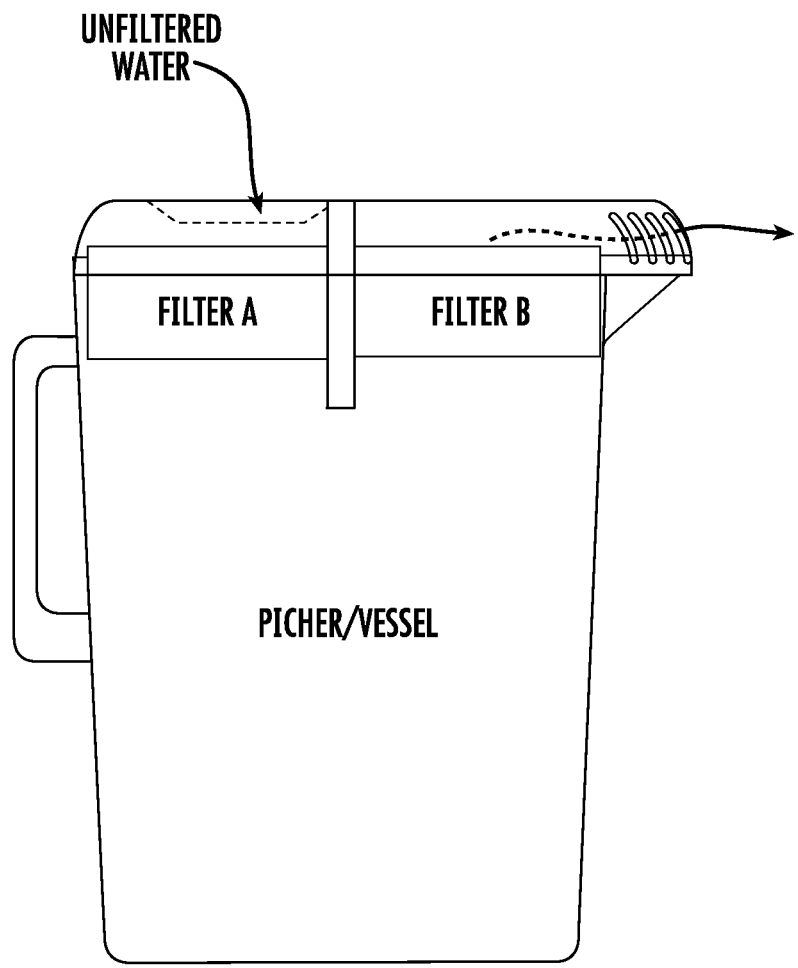
FIG. 35 is a schematic view of a vessel according to an aspect of the present disclosure showing filter medium treating fluid entering and leaving the vessel.
Figure 37:
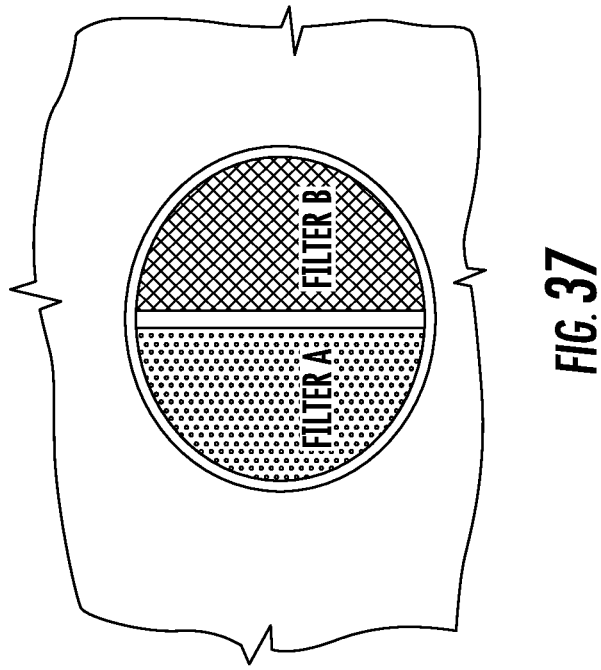
FIG. 37 is a top view of the filter used in the vessel design of FIG. 36.
Figure 36:
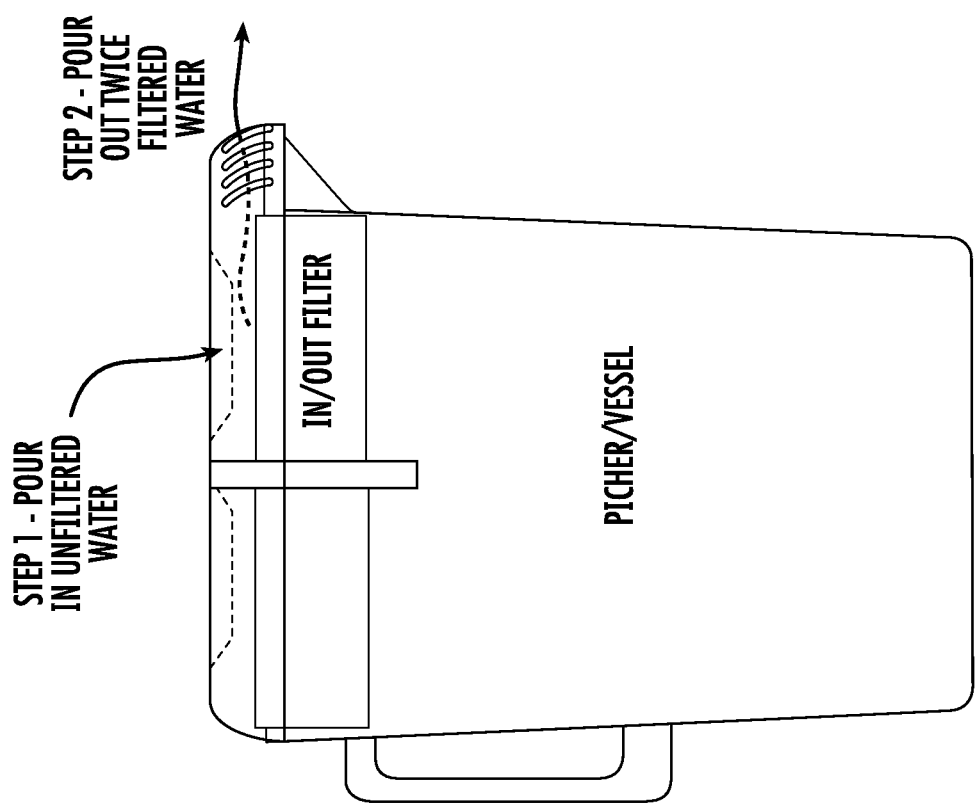
FIG. 36 is a schematic view of a vessel according to an aspect of the present disclosure showing the filter medium for treating intake fluid and when the fluid leaves the vessel.
Figure 40:
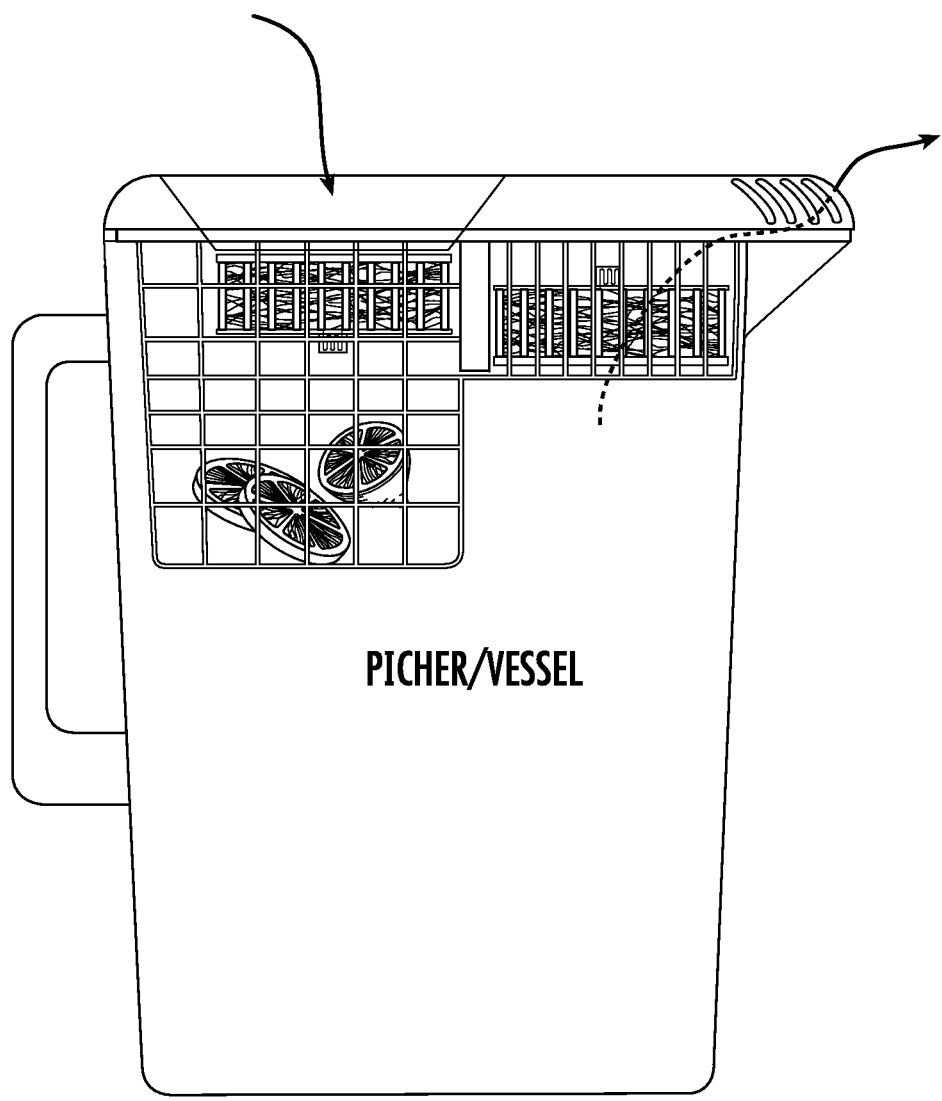
FIG. 40 is a schematic view of a vessel showing a filter treating intake fluid and fluid outgoing and also applying a flavorant and employing a flow sensor on the outlet sides of the filter(s)

Filters of the present disclosure typically also allow for fluid to be treated to flow in either direction through the filter and treat the fluid. As shown in FIGS. 35-39, the fast flow nature of the filter material typically used allows for a filter material to be positioned to treat intake water (or other fluid) flows through filter A and into the vessel and also be treated as the water (or other fluid) flows through filter B. This allows for some significant benefits. One such benefit allows for certain undesirable materials to be initially removed from a fluid, such as microorganisms and other impurities from untreated water, but leaving chlorine and other desirable materials within the water in the vessel during storage that would prevent further development of microorganisms while the water resides in the vessel and prior to consumption or use. The filter B may then be used to further treat the water (or other fluid) in the vessel as the water is dispensed for use. Of course, the water may be completely treated, depending on the filter media, for all impurities and undesired components while the untreated water is received and when it is dispensed. FIGS. 36-37 show a divided filter that has two separate filter media in the filter. The divided filter treats water in much the same manner as shown in FIG. 35, but the filter media are each positioned toward the outlet of the vessel and in such a manner that Filter B treats the fluid as it is poured from the vessel. In a final variant, the two filters, in the depicted versions may be stacked on either or both the intake side or the outlet side as depicted in FIGS. 38 and 39, respectively. In another variation, a flavorant such as a lemon flavor or lemon juice may be applied to the fluid within the vessel by engaging a flavor source within the vessel as shown in FIG. 40. The lemons or other flavorant may be held in the wire cage or other structure acting as a sieve for the prevention of pulp transfer that could clog a filter inlet and are typically located below the intake treatment filter.

Figure 41:
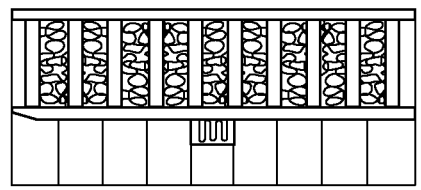
FIG. 41 is a cross-sectional view of a filter shown in FIG. 40 taken along the line XLI-XLI of FIG. 42.
Figure 42:
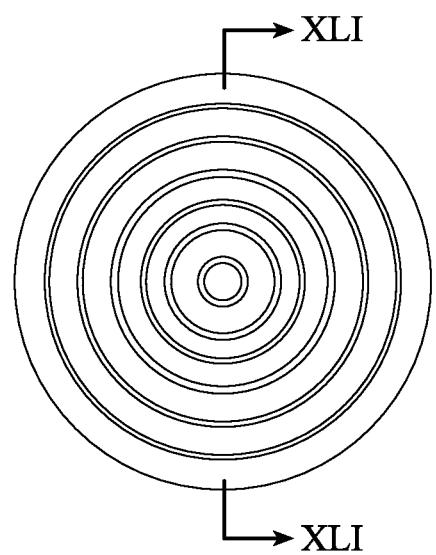
FIG. 42 is a bottom view of a filter used in FIG. 40.
Figure 43:
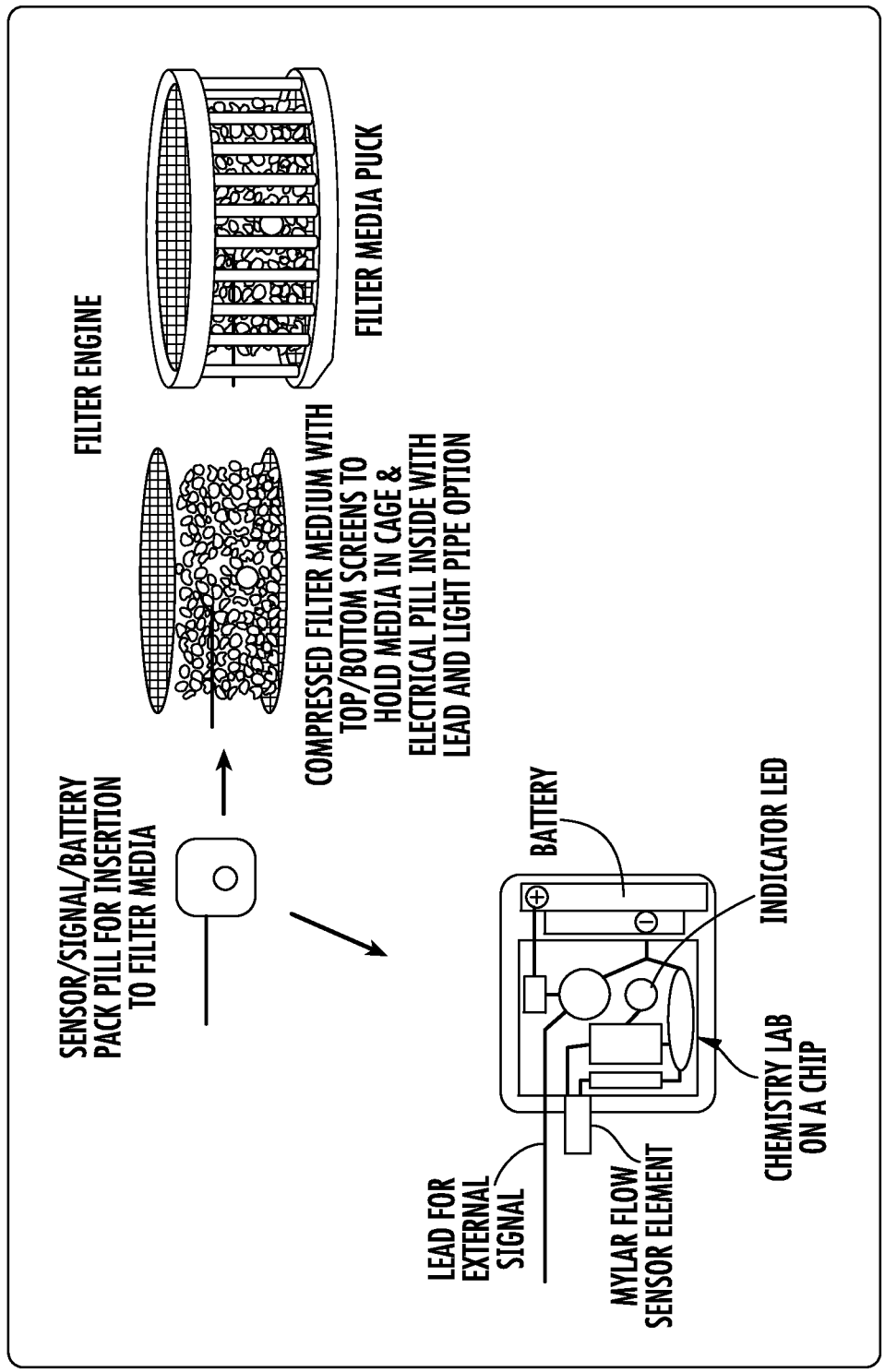
FIG. 43 is a schematic design of an electronic sensor/signal/battery pack "pill" that is positioned within the filter material of a filter.

In yet another aspect of the present disclosure, the filter may be constructed with a flow sensor on the outlet portion of the filter (see FIGS. 40-42). As shown in FIG. 43, the filter medium is typically an open cell medium such as a blown polyethylene, a loose granular such as activated carbon or an open weave fibrous material. A water filter flow sensor or other sensor/signal/battery pack pill may be spaced within the compressed filter medium. Sensors such as piezo electric flow detectors, timer circuits, chemical detectors, and indicator generators, such as, digital or analog signals or voltage or light may be used in the pill. The filter itself would provide operational data, status, filter type information, filter life (for example, by LED light indication—green=good, yellow=replace soon, and red=expired filter). The pill typically contains a battery power supply, timer circuit, flow sensors, and/or chemistry sensor(s). The electronic components of the pill typically are disposable or recyclable such that the expired filter with the pill placed within the filter medium may be either disposed in the trash or recycled.

The piezo sensor may be a MYLAR™, which is biaxially-oriented polyethylene terephthalate, a polyester film made from stretched polyethylene terephthalate (PET), of a few thousandths of an inch thick that produces an electrical signal when mechanical force is applied. This may be amplified sufficiently by a circuit to increment a counter to measure the total of the volume of water that has flowed through the vessel. Typically, this is measured upon the fluid/water exiting the vessel as opposed to as the fluid/water enters or both. When the total volume is reached, a transistor switch can turn power on to a red LED to indicate that the filter has expired. The signal can also be fed to a second driver to cause an LED to, for example, flash an LED blue when water is being poured. The piezo sensor can be either incorporated into the filter or into the filter medium itself as discussed above. The sensor can be placed into a single channel to provide a more accurate measurement.

Alternatively, a dissolving polymer may be employed in a proportion to the volume of water to be treated. This can have a spring loaded follower component resting on it. The follower can be brightly colored with bands of different color. Green can indicate the filter is okay and bright red when the filter has expired. A circuit with parallel resistances can also be set up. As the water dissolves and provides local short circuiting of the stage the resistance changes and the LED intensity or color changes. An RGB LED is typically employed.

Additionally, the interface between the filter and the adapter can have a number of physical and/or electrical tabs that can combine to indicate what filter type are attached. When twisted, for example, a colored pointer may indicate what type of filter is engaged, i.e. a CTO (chlorine, taste and odor filter) or a microbial filter by displaying a different color for each, such as green and blue respectively. Additionally, metal tabs could be included in various positions along the circumference of the interface ring between the adapter and the filter that would match with contact on the filter housing or other surface that create the corresponding signal and display for the type of filter.

Figure 44:
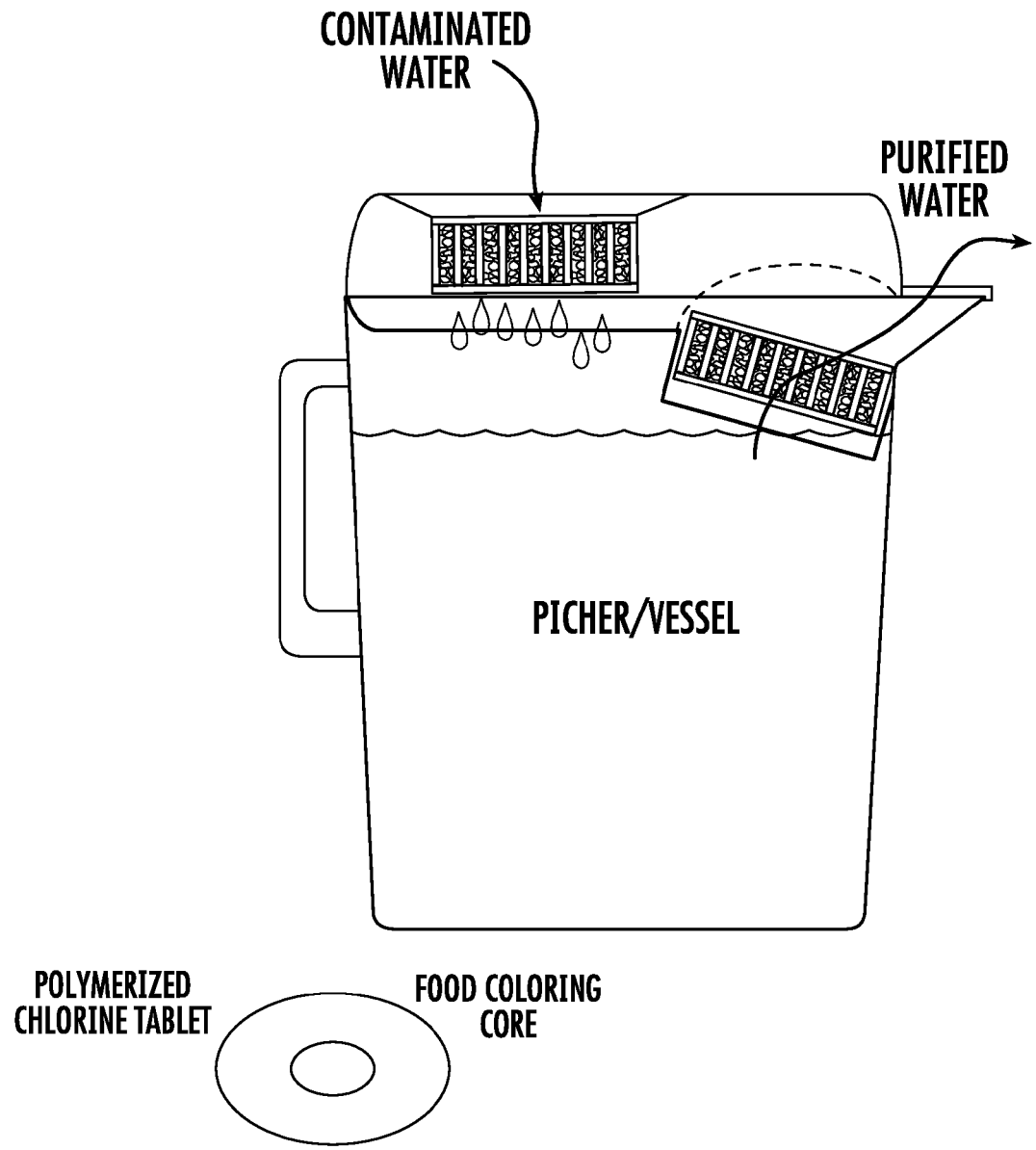
FIG. 44 is a schematic design of a vessel showing a filter treating outgoing fluid and a treatment medium (filter) that contains a chloride "battery" that supplies chlorine to intake water that in delivered into the vessel through the treatment medium.
Figure 45:
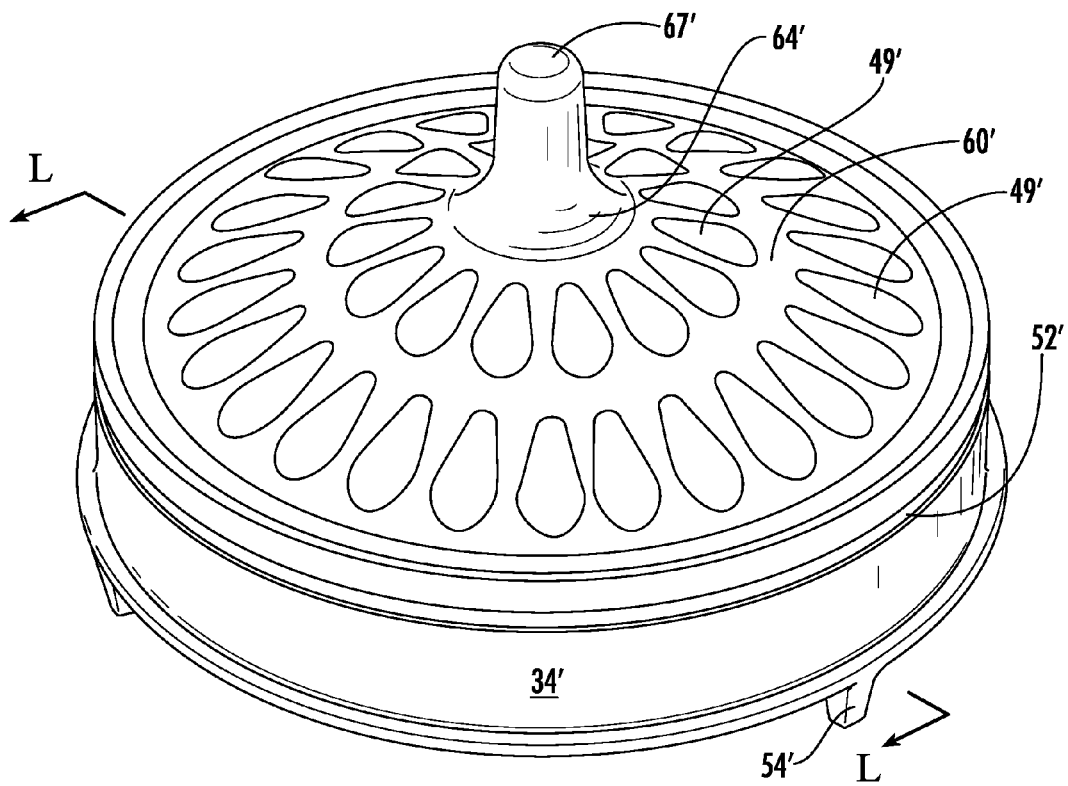
FIG. 45 is a perspective view of the filter according to another aspect of the present disclosure.
Figure 46:
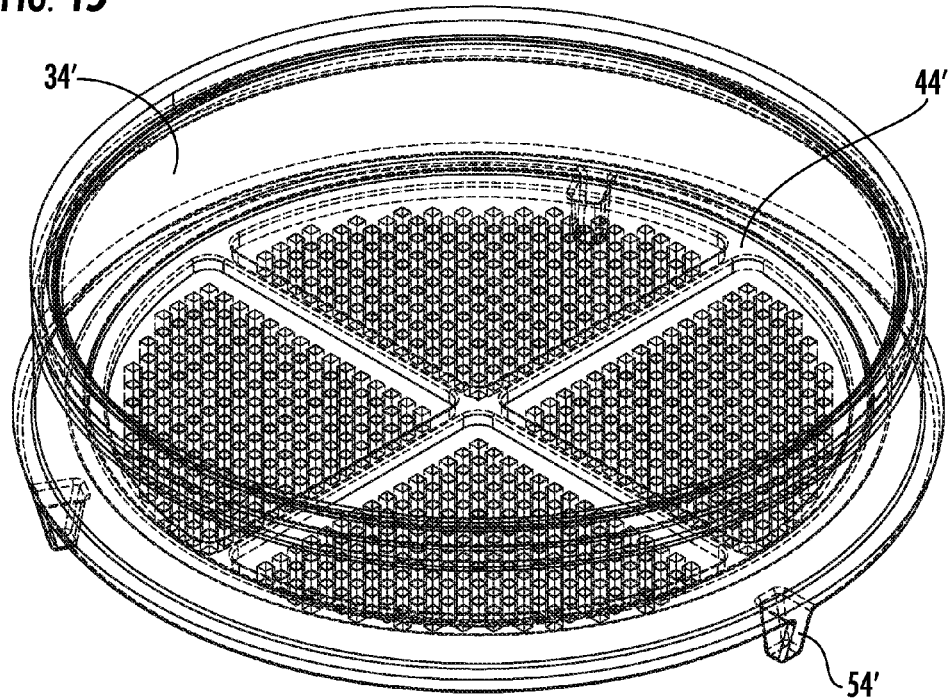
FIG. 46 is a perspective view of the filter shown in FIG. 45 with the top cap portion removed.
Figure 47:
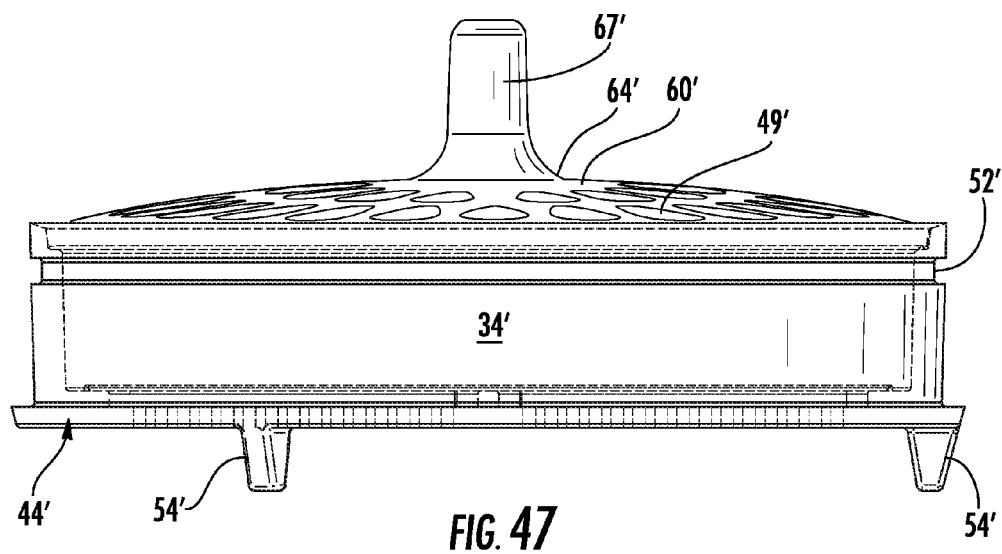
FIG. 47 is an elevated side view of the filter shown in FIG. 45.
Figure 48:
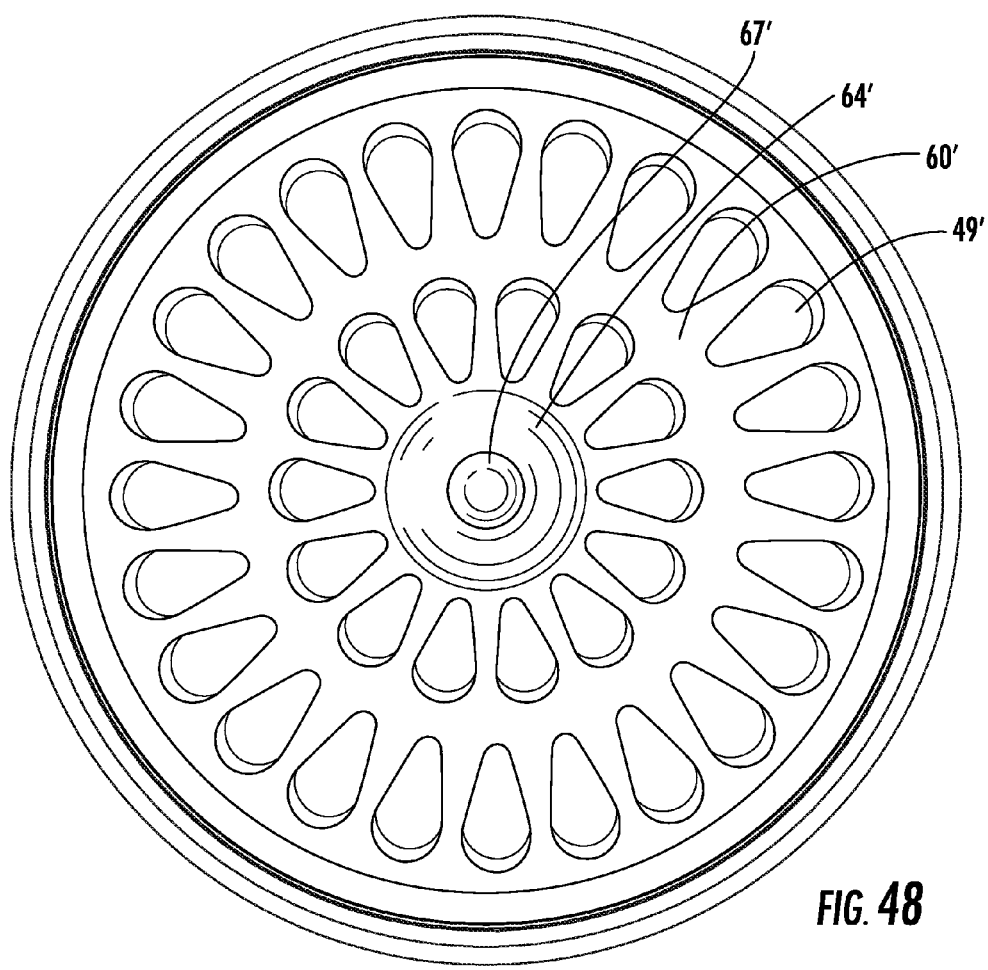
FIG. 48 is a top view of the filter shown in FIG. 45.

A chlorine pill or halogen could also be a bromine or iodine compound. As shown in FIG. 44, a vessel system may utilize a chlorine component or other halogen compound as a water treatment media for water that is taken into the vessel. The "chlorine battery" may be made of a polymerized chlorine compound. This material dissolves in water in proportion to the volume of water that has flowed over it, releasing chlorine in a regulated amount based upon water volume and thereby disinfecting the water. The system may further employ a chemistry based color change indicator located at the filter outlet is provided to notify user of filter life state change, such as the presence of chlorine at the filter exit indicating the filter medium is no longer removing chlorine from the flow. The water flowing out of a second/subsequent water treatment media would typically have the chlorine, taste and odor components removed by a filter of the present disclosure positioned at the outlet of the vessel. This system makes the outgoing water pleasant to drink and microbiologically safe.

An alternative filter 16' of the present disclosure is shown in FIGS. 45-51. The filter top 60' is domed shaped. A mesh material 43' is typically engaged with the top of the filter side wall section 34', for example within a slot (not shown) that runs about the interior perimeter surface of the filter side wall section 34'. The mesh screen material 43' across the top of the filter and beneath the domed filter top 60' is typically constructed of stainless steel or a plastic material such as polypropylene or polyethylene or other thermoplastic polymer material. The mesh is constructed and engaged with the filter side wall such that it is capable and configured to expand upward into the domed section if the filter material 48' expands. The top mesh 43' may be heat staked to the side wall section. Alternatively, it could be positioned within a slot described above. The mesh material may be less than taut across the top of the filter in order to further facilitate this expansion. When engaged within a slot, the expansion may also facilitated by the mesh screens engagement to the side wall section 34' such that it laterally moves, if necessary, within a slot on the interior surface of the side wall as discussed above. Other engagements, constructions and materials that allow for the mesh screen to expand while still retaining the filter material can also be employed. The filter material 48' may be a loose media and not a compressed media.

The side wall section 34' is integral with the filter base 44' according to this aspect of the present disclosure. The side wall section 34' and the base 44' are typically injection molded thermoplastic material such as polypropylene or polyethylene. These components form a "can" like structure with a generally upwardly facing, U-shaped cross-section. The mesh component 43' positioned at the base is typically integrally engaged to the base and molded into the base. The mesh may be constructed of any of the materials discussed above that might be used for the screen on the top of the filter.

Figure 50:
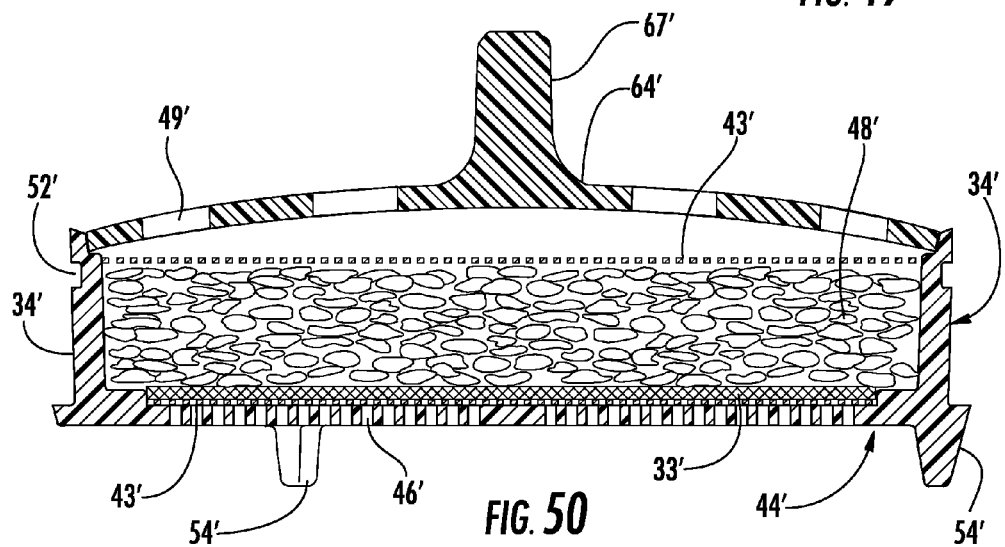
FIG. 50 is a cross-section view of the filter of FIG. 45 taken along line L-L.

As shown in FIG. 50, the filter may also employ an open cell polyethylene expansion block 33'. The open cell material could conceivably be another polymer material. This material's primary function is as a safeguard against damage caused by expansion of the filter material 48'. If the filter material 48' has already been hydrated and is a type of filter media that expands such that the filter media has already expanded into the domed portion of the filter, this material prevents damage if, for example, the filter in such a condition is placed into a freezing environment that would cause the water within the filter material to further expand as it becomes solid.

Figure 51:
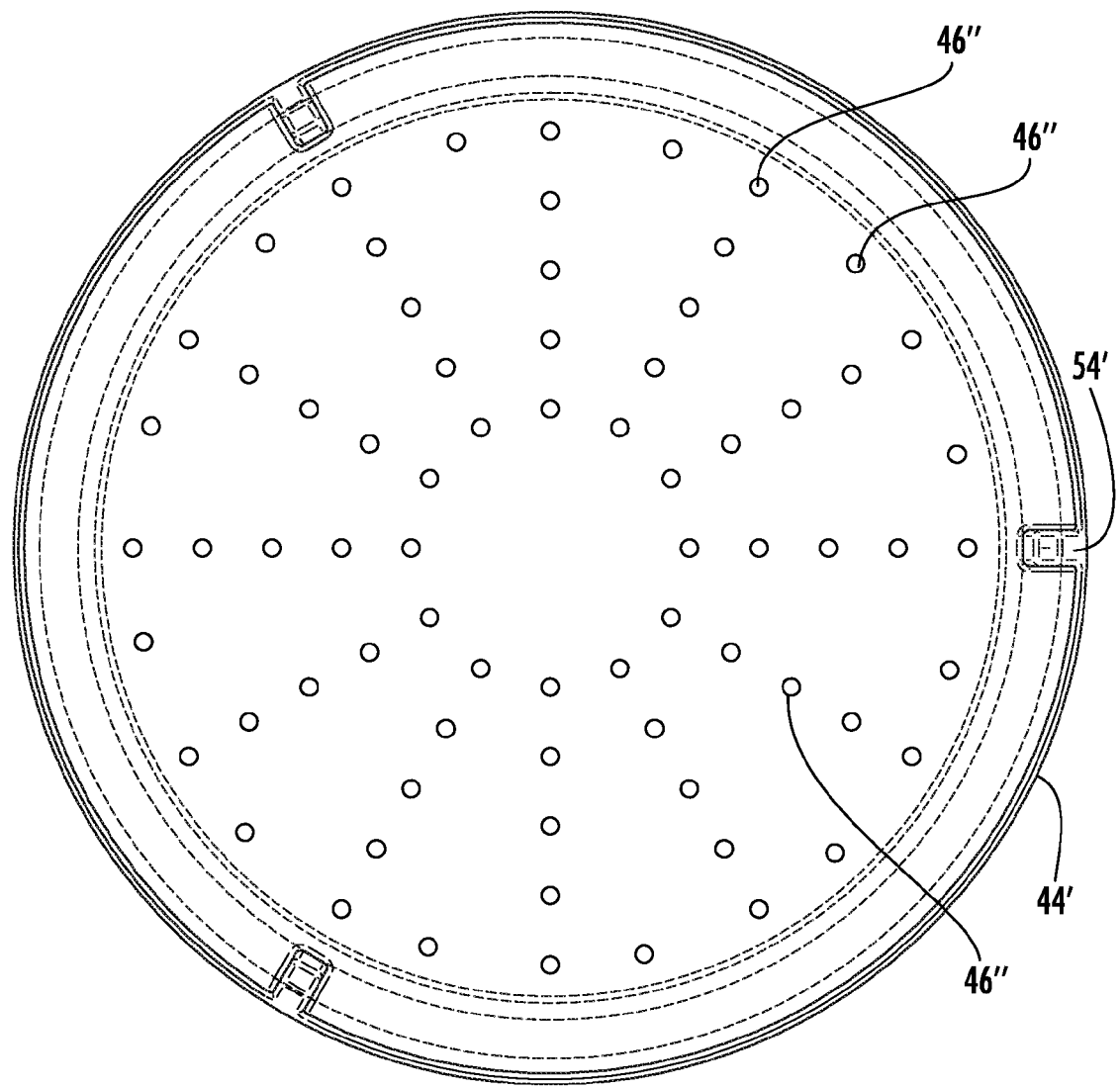
FIG. 51 is a bottom view of a filter, such as the filter shown in FIG. 45, according to another aspect of the present invention.

The apertures 49' in the domed filter top 60' are shown shaped as raindrops, but could be any shape desired. The apertures 46' in the base are typically smaller apertures that have a square cross-section with apertures having a diameter of from about 0.5 mm to about 2.0 mm, more typically from about 1.0 mm to about 2.0 mm. A slightly modified pattern of apertures 46" are shown in FIG. 51. The apertures of FIG. 51 are typically similarly sized as discussed above. The apertures are distributed in a generally spoked pattern about a central ring of apertures and have an outer ring of apertures around the peripheral portion of the base as shown in FIG. 51. This size and shape of aperture in the base (see FIG. 51) causes the filtered/treated water to fall into a vessel or into the bottom funnel portion in a manner that drips across the surface of the base and resembles rainfall.

The invention claimed is:
1. A water pitcher in combination with a gravity-driven water filtration system comprising:
  the gravity-driven water filtration system including a bottom portion having a treated water outlet opening, an upper perimeter, and a bottom portion side wall that defines an interior volume of the bottom portion, and wherein the bottom portion side wall is a shaped surface configured to frictionally engage a plurality of differently sized water apertures and still deliver treated water through the treated water outlet opening;
  the gravity-driven filtration system including a water filter comprising a container and a water treatment medium positioned within the container, wherein the container is operably engaged with the bottom portion and has intake openings in an upper portion thereof and outlet openings in a lower portion thereof, whereby the outlet openings of the container deliver treated water to the interior volume of the bottom portion and the treated water flows out of the interior volume of the bottom portion through the treated water outlet opening of the bottom portion;

the gravity-driven filtration system including a top portion having an interior volume defined by a side wall, a water inlet opening at a top of the top portion, and a bottom perimeter defining a water outlet opening, and wherein the water inlet opening of the top portion is configured to receive untreated water, and the water outlet opening of the top portion is configured to allow untreated water to flow into contact with the inlet openings in the upper portion of the water filter; and wherein the water filter is configured to be removably engaged by hand without the use of tools from the bottom portion, and the water filter, the bottom portion and the top portion are each configured to be removably engaged and disengaged to allow for replacement of the water filter and reassembly of the overall gravity-driven water filtration system filtering by hand and without the use of tools;

the water pitcher including a water receiving aperture configured to allow a water to be delivered into an interior water storage volume, wherein the interior water storage volume is defined by at least one upwardly extending wall extending upward from a base, wherein the water receiving aperture is engaged by the gravity-driven water filtration system;

wherein the at least one upwardly extending wall comprises an inner, water facing wall section having an inner water facing surface and an outer user facing wall section having an outer user facing surface wherein the inner water facing wall section comprises a material chosen from the group consisting of glass, stainless steel, gold, silver, and mixtures thereof, and the outer user facing wall section comprises a material chosen from the group consisting of glass, plastic, and stainless steel; and wherein the inner water facing surface and the outer user facing surface are not both glass unless the glass is blow molded or vapor deposited as a layer onto another media chosen from the group consisting of a plastic, a metal, and mixtures thereof thereby forming a composite material with glass layer on at least one of the inner, facing wall section and the outer user facing wall section.

2. The combination of claim 1, wherein at least one of the water facing wall section and outer user facing wall section are a composite having a glass layer on a substrate and the glass layer is the inner, water facing surface or the outer user facing surface, and further comprising a handle engaged with the upwardly extending wall.

3. The combination of claim 2, wherein each of the inner, water facing wall section and the outer user facing wall section are a composite having a glass layer on a substrate and the glass layer is the inner, water facing surface and the outer user facing surface overlays the inner water facing surface and is another layer.

4. The combination of claim 3, wherein the inner, water facing surface is part of a first upwardly extending wall section and the outer user facing surface is part of a second upwardly extending wall section that are different sections of the at least one upwardly extending wall and define an airspace therebetween such that the water pitcher forms a double-walled pitcher.

5. The combination of claim 2, wherein the substrate is a plastic substrate having a surface and wherein the glass layer is layered onto the surface of the plastic substrate and the plastic substrate forms the outer user-facing surface.

6. The combination of claim 2, wherein the inner fluid water facing surface is part of a first upwardly extending wall section and the outer user facing surface is part of a second upwardly extending wall section that are different and define an airspace therebetween such that the water pitcher forms a double-walled pitcher.

7. The combination of claim 1, wherein the inner, water facing wall section and the outer user facing wall section are part of the same upwardly extending wall such that the water pitcher is a single walled liquid pitcher where the at least one upwardly extending wall is a bilayer composite wherein the inner, water facing surface is glass engaged to the outer user facing surface which is plastic.

8. The combination of claim 1, wherein the inner, water facing wall section and the outer user facing wall section are different and define an airspace therebetween such that the water pitcher forms a double-walled pitcher.

9. The combination of claim 1 further comprising a handle engaged with the at least one upwardly extending wall and wherein the at least one upwardly extending wall is formed of a bilayer composite where the outer user facing surface is a plastic layer of the bilayer composite and the inner, water facing surface is glass.

10. The combination of claim 1, wherein the gravity-driven water treatment medium allows for a water flow rate of at least about two liter per minute of flow through the water treatment medium and wherein the water treatment medium reduces chlorine taste and odor components.

11. The combination of claim 1 wherein the pitcher comprises a top member having a handle, wherein the top member is threadably engaged to an upper portion of the upwardly extending wall, wherein the top member defines the water receiving aperture therein, and wherein the gravity-driven water filtering system is positioned within and frictionally engaged with the water receiving aperture.

12. The combination of claim 1, wherein the at least one upwardly standing wall comprises a bilayer composite wall.

* * * * *